US012543123B2

(12) United States Patent
Bhattacharya et al.

(10) Patent No.: US 12,543,123 B2
(45) Date of Patent: Feb. 3, 2026

(54) SELECTIVE SPATIAL REUSE TRANSMISSIONS

(71) Applicant: QUALCOMM Incorporated, San Diego, CA (US)

(72) Inventors: Abhijit Bhattacharya, Bangalore (IN); Vinod Belur Ramachandra, Chennai (IN); Arul Durai Murugan Palanivelu, Bangalore (IN); Raj Kumar Krishna Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/245,711

(22) PCT Filed: Oct. 27, 2021

(86) PCT No.: PCT/US2021/056887
§ 371 (c)(1),
(2) Date: Mar. 16, 2023

(87) PCT Pub. No.: WO2022/093984
PCT Pub. Date: May 5, 2022

(65) Prior Publication Data
US 2023/0370978 A1 Nov. 16, 2023

(30) Foreign Application Priority Data
Nov. 2, 2020 (IN) .............................. 202041047773

(51) Int. Cl.
*H04W 52/24* (2009.01)
*H04L 1/00* (2006.01)
*H04W 52/22* (2009.01)

(52) U.S. Cl.
CPC ......... *H04W 52/245* (2013.01); *H04L 1/0003* (2013.01); *H04W 52/225* (2013.01); *H04W 52/242* (2013.01)

(58) Field of Classification Search
CPC ............. H04W 52/242; H04W 52/245; H04W 52/247; H04W 52/286
See application file for complete search history.

(56) References Cited

U.S. PATENT DOCUMENTS

2017/0070962 A1 3/2017 Wang et al.
2017/0079044 A1 3/2017 Zhu et al.
2019/0150083 A1 5/2019 Ponnuswamy

OTHER PUBLICATIONS

European Search Report—EP24211835—Search Authority—The Hague—Feb. 6, 2025.
International Search Report and Written Opinion—PCT/US2021/056887—ISA/EPO—Feb. 23, 2022.

*Primary Examiner* — Sam Bhattacharya
(74) *Attorney, Agent, or Firm* — Kevin M. Donnelly; Holland & Hart LLP

(57) ABSTRACT

This disclosure provides systems, methods and apparatuses for selectively using spatial reuse (SR) transmissions in the presence of an overlapping basic service set (OBSS) transmission. In some implementations, a wireless communication device may transmit data to another wireless communication device using SR packets in the presence of an OBSS transmission or interference only when the signal strength of SR packets received at the other wireless communication device is greater than an amount of signal degradation of the OBSS transmission caused by the SR transmission.

30 Claims, 23 Drawing Sheets

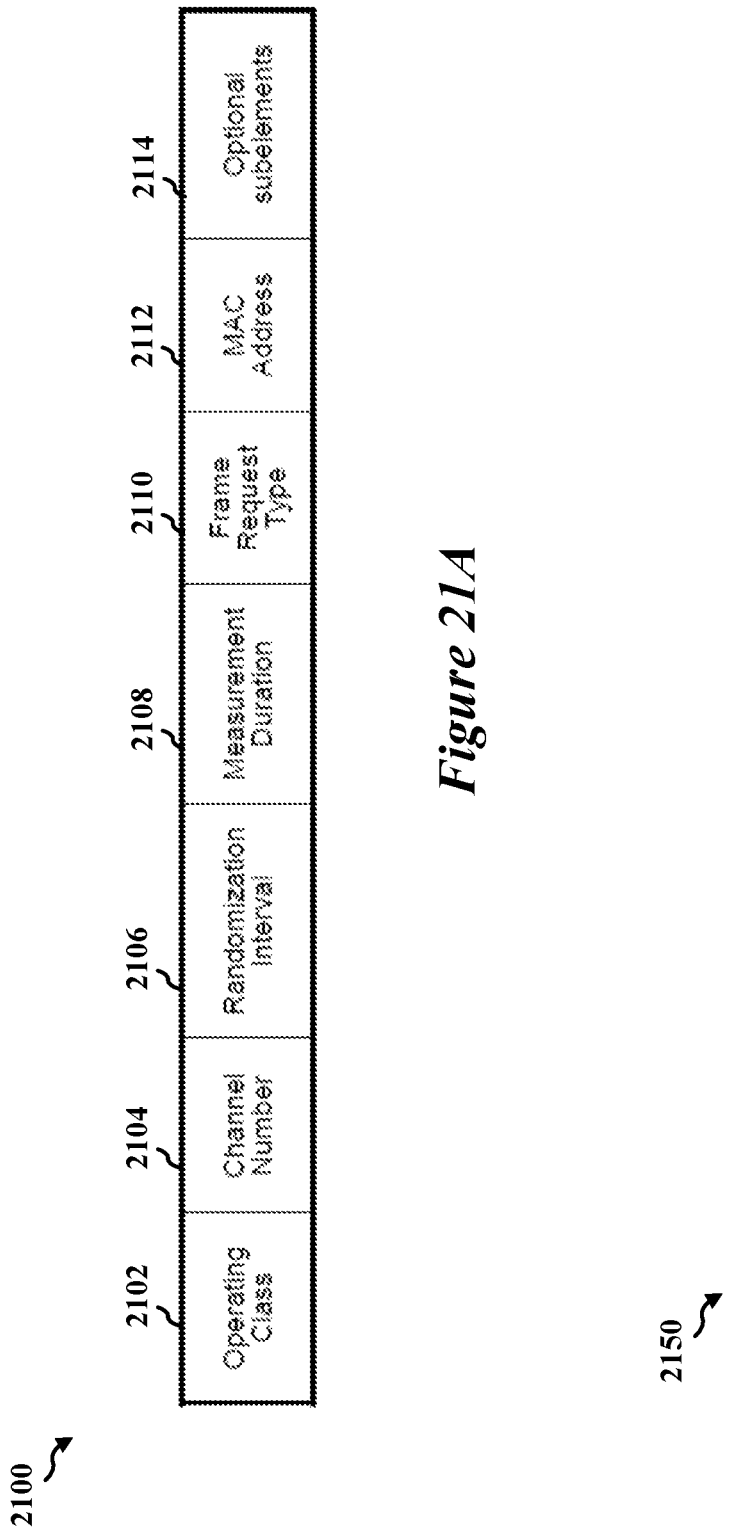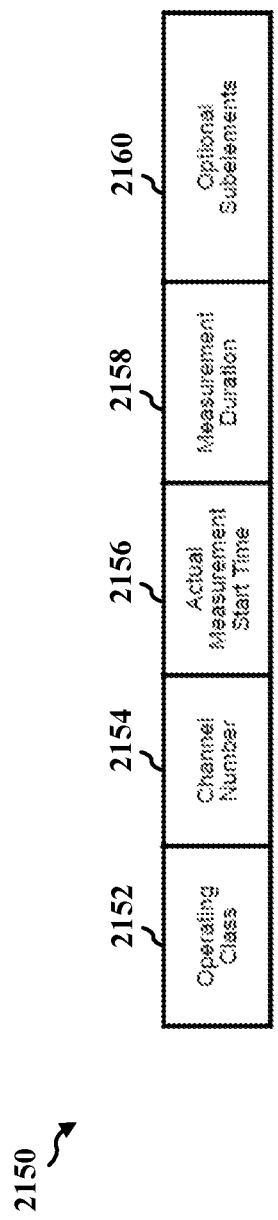
*Figure 21A*
*Figure 21B*

SELECTIVE SPATIAL REUSE TRANSMISSIONS

CROSS-REFERENCE TO RELATED APPLICATIONS

The present Application is a 371 national stage filing of International PCT Application No. PCT/US2021/056887 by BHATTACHARYA et al. entitled "SELECTIVE SPATIAL REUSE TRANSMISSIONS," filed Oct. 27, 2021; and claims priority to India Foreign patent application No. 202041047773 by BHATTACHARYA et al. entitled "SELECTIVE SPATIAL REUSE TRANSMISSIONS" filed on Nov. 2, 2020, each of which is assigned to the assignee hereof, and each of which is expressly incorporated by reference in its entirety herein.

TECHNICAL FIELD

This disclosure relates generally to wireless communications, and more specifically, to spatial reuse (SR) opportunities on a shared wireless medium.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many wireless networks use random channel access mechanisms to control access to a shared wireless medium. In these wireless networks, wireless devices contend with each other to gain access to the wireless medium. The wireless device that wins the contention operation becomes the owner of a transmission opportunity (TXOP) and may use the wireless medium for a duration of the TXOP. Other wireless devices are generally not permitted to transmit during the TXOP, for example, to prevent interference with transmissions from the TXOP owner.

Spatial reuse (SR) techniques allow other wireless devices to transmit packets on the wireless medium while the TXOP owner is transmitting if a power level of the TXOP owner's transmissions is below a certain value. Due to network conditions, conventional SR techniques may undesirably allow wireless devices to transmit SR packets that ultimately interfere with transmissions from the TXOP owner, and may also undesirably restrict wireless devices from transmitting SR packets, even when no interference may occur.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication by a first wireless access point (AP) associated with a first basic service set (BSS). In some implementations, the method includes determining a first expected received signal strength at a first wireless station associated with the first BSS for a first wireless packet to be transmitted by the first AP on a wireless medium, and determining a second expected received signal strength at the first wireless station for a second wireless packet transmitted or to be transmitted by a second AP associated with an overlapping BSS (OBSS). The method includes determining a third expected received signal strength at a second wireless station associated with the OBSS for the first wireless packet to be transmitted by the first AP and determining a noise floor of the wireless medium. The method includes transmitting or not transmitting the first wireless packet based on whether a first ratio of the first expected received signal strength to a sum of the second expected received signal strength and the noise floor is greater than a second ratio of the third expected received signal strength to the noise floor.

In some implementations, determining the first expected received signal strength may include transmitting one or more intra-BSS packets to the first wireless station, receiving a first indication of a first received signal strength of the one or more intra-BSS packets as measured at the first wireless station, and determining the first expected received signal strength based on the first received signal strength. In some instances, determining the first expected received signal strength may also include determining a path loss to the first wireless station based on the first received signal strength of the one or more intra-BSS packets as measured by the first wireless station, and determining the first expected received signal strength based on the determined path loss to the first wireless station. The path loss to the first wireless station may be determined by determining an average path loss to the first wireless station over a period of time during which the one or more intra-BSS packets are transmitted to the first wireless station.

In some implementations, the method may also include transmitting a first request to the first wireless station to measure the received signal strength of the one or more intra-BSS packets. In some instances, each of the one or more intra-BSS packets may be a beacon frame. In some other instances, the first request may be a beacon request, and the first indication may be received in one or more beacon reports responsive to the beacon request.

In some implementations, determining the second expected received signal strength may include receiving a second indication of a second received signal strength of each of one or more OBSS packets transmitted by the second AP as measured at the first wireless station, determining a third received signal strength of each of the one or more OBSS packets transmitted by the second AP as measured at the first AP, and determining the second expected received signal strength based on the second and third received signal strengths. In some instances, the method may also include transmitting a second request to the first wireless station to measure a Received Channel Power Indicator (RCPI) for the one or more OBSS packets. The second request may be a frame request, and the second indication may be received in a frame report responsive to the frame request. In some instances, the second indication may be an average RCPI of the RCPIs determined for the one or more OBSS packets.

In some other implementations, determining the second expected received signal strength may include determining an average of the third received signal strengths of the one or more OBSS packets at the first AP, and determining the second expected received signal strength based on the average RCPI of the one or more OBSS packets received at the first wireless station plus an instantaneous value of third received signal strengths minus the average of the third received signal strengths. In some instances, determining the third received signal strength may include determining an average receive power at the first AP based on the third received signal strengths determined for the one or more OBSS packets, where the second expected received signal strength is based on the second received signal strengths and the determined average receive power.

In some implementations, determining the third expected received signal strength may include determining a fourth received signal strength of at least one OBSS packet transmitted from the second wireless station and measured at the first AP, and determining the third expected received signal strength based on the fourth received signal strength, an estimate of a transmit power of the second wireless station, and a transmit power of the first AP for the first wireless packet. In some instances, the transmit power of the second wireless station may be estimated by estimating a path loss to each of a plurality of wireless stations in the first BSS, determining an average receive power at the first AP for wireless packets received from each of the plurality of wireless stations in the first BSS, estimating an average transmit power for each of the plurality of wireless stations in the first BSS based on the respective estimated path loss, the respective average receive power, and a respective modulation and coding scheme (MCS) used for transmissions by the respective wireless station, and estimating the transmit power of the second wireless station based on the estimated average transmit powers of the plurality of wireless stations in the first BSS. In some other instances, estimating the transmit power of the second wireless station may include determining, as the estimate of the transmit power of the second wireless station, a lowest one of the estimated average transmit powers. In some aspects, the plurality of wireless stations in the first BSS includes the first wireless station.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to determine a first expected received signal strength at a first wireless station associated with the first BSS for a first wireless packet to be transmitted by the wireless communication device on a wireless medium, and to determine a second expected received signal strength at the first wireless station for a second wireless packet transmitted or to be transmitted by an AP associated with an OBSS. Execution of the processor-readable code is configured to determine a third expected received signal strength at a second wireless station associated with the OBSS for the first wireless packet to be transmitted by the wireless communication device, and to determine a noise floor of the wireless medium. Execution of the processor-readable code is configured to transmit or not transmit the first wireless packet based on whether a first ratio of the first expected received signal strength to a sum of the second expected received signal strength and the noise floor is greater than a second ratio of the third expected received signal strength to the noise floor. In some instances, each of the one or more intra-BSS packets may be a beacon frame.

In some implementations, execution of the processor-readable code to determine the first expected received signal strength is configured to transmit one or more intra-BSS packets to the first wireless station, to receive a first indication of a first received signal strength of the one or more intra-BSS packets as measured at the first wireless station, and to determine the first expected received signal strength based on the first received signal strength. In some instances, execution of the processor-readable code to determine the first expected received signal strength is configured to determine a path loss to the first wireless station based on the first received signal strength of the one or more intra-BSS packets as measured by the first wireless station, and to determine the first expected received signal strength based on the determined path loss to the first wireless station. The path loss to the first wireless station may be determined by determining an average path loss to the first wireless station over a period of time during which the one or more intra-BSS packets are transmitted to the first wireless station.

In some implementations, execution of the processor-readable code may also be configured to transmit a first request to the first wireless station to measure the received signal strength of the one or more intra-BSS packets. In some instances, each of the one or more intra-BSS packets may be a beacon frame. In some other instances, the first request may be a beacon request, and the first indication may be received in one or more beacon reports responsive to the beacon request.

In some implementations, execution of the processor-readable code to determine the second expected received signal strength may be configured to receive a second indication of a second received signal strength of each of one or more OBSS packets transmitted by the AP as measured at the first wireless station, to determine a third received signal strength of each of the one or more OBSS packets transmitted by the AP as measured at the wireless communication device, and to determine the second expected received signal strength based on the second and third received signal strengths. In some instances, execution of the processor-readable code may also be configured to transmit a second request to the first wireless station to measure a RCPI for the one or more OBSS packets. The second request may be a frame request, and the second indication may be received in a frame report responsive to the frame request. In some instances, the second indication may be an average RCPI of the RCPIs determined for the one or more OBSS packets.

In some other implementations, execution of the processor-readable code to determine the second expected received signal strength may be configured to determine an average of the third received signal strengths of the one or more OBSS packets at the wireless communication device, and to determine the second expected received signal strength based on the average RCPI of the one or more OBSS packets received at the first wireless station plus an instantaneous value of third received signal strengths minus the average of the third received signal strengths. In some instances, execution of the processor-readable code to determine the third received signal strength may be configured to determine an average receive power at the wireless communication device based on the third received signal strengths determined for the one or more OBSS packets, where the second expected received signal strength is based on the second received signal strengths and the determined average receive power.

In some implementations, execution of the processor-readable code to determine the third expected received signal strength may be configured to determine a fourth received signal strength of at least one OBSS packet transmitted from the second wireless station and measured at the wireless communication device, and to determine the third expected received signal strength based on the fourth received signal strength, an estimate of a transmit power of the second wireless station, and a transmit power of the wireless communication device for the first wireless packet. In some instances, the transmit power of the second wireless station may be estimated by estimating a path loss to each of a plurality of wireless stations in the first BSS, determining an average receive power at the wireless communication device for wireless packets received from each of the plurality of wireless stations in the first BSS, estimating an average transmit power for each of the plurality of wireless stations in the first BSS based on the respective estimated path loss, the respective average receive power, and a respective MCS used for transmissions by the respective wireless station, and estimating the transmit power of the second wireless station based on the estimated average transmit powers of the plurality of wireless stations in the first BSS. In some other instances, estimating the transmit power of the second wireless station may include determining, as the estimate of the transmit power of the second wireless station, a lowest one of the estimated average transmit powers. In some aspects, the plurality of wireless stations in the first BSS includes the first wireless station.

Another innovative aspect of the subject matter described in this disclosure can be implemented as a method for wireless communication by a first AP associated with a first BSS. In some implementations, the method includes transmitting one or more first wireless packets, and receiving, from a first wireless station associated with the first BSS, a first indication of a first received signal strength of the one or more first wireless packets as measured at the first wireless station. The method includes receiving, from the first wireless station, a second indication of a second received signal strength of one or more second wireless packets transmitted by a second AP associated with an OBSS as measured at the first wireless station. The method includes determining third received signal strengths of one or more third wireless packets transmitted by the second AP as measured at the first AP, and determining fourth received signal strengths of one or more fourth wireless packets transmitted by a second wireless station associated with the OBSS as measured at the first AP. The method includes transmitting or not transmitting a fifth wireless packet to the first wireless station based on the first, the second, the third, and the fourth received signal strengths.

In some implementations, one or more of the first received signal strengths, the second received signal strengths, the third received signal strengths, or the fourth received signal strengths may be an average received signal strength. In some instances, each of the one or more first wireless packets may be a beacon frame, each of the one or more second wireless packets may be an OBSS packet, and each of the one or more third wireless packets may be an OBSS packet. In some implementations, the one or more second wireless packets may be the same packets as the one or more third wireless packets.

In some implementations, the method may include transmitting a first request to the first wireless station to measure the first received signal strength of the one or more first wireless packets. In some instances, the first request may be a beacon request, and the first indication may be received in a beacon report responsive to the beacon request. In some other implementations, the method may also include transmitting a second request to the first wireless station to measure the second received signal strength the one or more second wireless packets. In some instances, the second request may be a frame request, and the second indication may be received in one or more frame reports responsive to the frame request. In some other instances, the second indication may be an average RCPI of the one or more second wireless packets transmitted by the second AP.

In some implementations, the method may also include determining a path loss to the first wireless station based on the first received signal strengths, and determining a first expected received signal strength for the fifth wireless packet at the first wireless station based at least in part on the determined path loss. In some instances, transmitting or not transmitting the fifth wireless packet may be based at least in part on the first expected received signal strength. In some other implementations, determining the path loss to the first wireless station may include determining an average path loss to the first wireless station over a period of time during which the one or more first wireless packets are transmitted, where the first expected received signal strength may be based on the determined average path loss.

In some implementations, the method may also include determining a second expected received signal strength at the first wireless station for a wireless packet transmitted by the second AP based on the second received signal strengths and the third received signal strengths, where transmitting or not transmitting the fifth wireless packet may be based at least in part on the second expected received signal strength. In some instances, determining the third received signal strengths of the one or more third wireless packets may include determining an average receive power at the first AP based on the third received signal strengths, where the second expected received signal strength may be based at least in part on the second received signal strengths and the determined average receive power.

In some implementations, the method may also include estimating a transmit power of the second wireless station associated with the OBSS, and determining an expected received signal strength at the second wireless station for the fifth wireless packet transmitted by the first AP based on the fourth received signal strengths, the estimated transmit power of the second wireless station, and a transmit power of the first AP for the fifth wireless packet. In some instances, transmitting or not transmitting the fifth wireless packet may be based at least in part on the expected received signal strength at the second wireless station for the fifth wireless packet.

In some implementations, estimating the transmit power of the second wireless station may include estimating a path loss to each of a plurality of wireless stations in the first BSS, determining an average receive power at the first AP for wireless packets received from each of the plurality of wireless stations in the first BSS, estimating an average transmit power for each of the plurality of wireless stations in the first BSS based on the respective estimated path loss, the respective average receive power, and a respective MCS used for transmissions by the respective wireless station, and estimating the transmit power of the second wireless station based on the estimated average transmit powers of the plurality of wireless stations in the first BSS. The plurality of wireless stations in the first BSS may include the first wireless station. In some instances, estimating the transmit power of the second wireless station may include determining, as the estimated transmit power of the second wireless station, a lowest one of the estimated average transmit powers.

In some implementations, the method may also include determining a noise floor, where the transmitting or not transmitting the fifth wireless packet is further based on determining that a first ratio of the first expected received signal strength to a sum of the second expected received signal strength and the noise floor is greater than a second ratio of the third expected received signal strength to the noise floor.

Another innovative aspect of the subject matter described in this disclosure can be implemented in a wireless communication device associated with a first BSS. The wireless communication device may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to transmit one or more first wireless packets, and to receive, from a first wireless station associated with the first BSS, a first indication of a first received signal strength of the one or more first wireless packets as measured at the first wireless station. Execution of the processor-readable code is configured to receive, from the first wireless station, a second indication of a second received signal strength of one or more second wireless packets transmitted by an AP associated with an OBSS as measured at the first wireless station. Execution of the processor-readable code is configured determine third received signal strengths of one or more third wireless packets transmitted by the second AP as measured at the wireless communication device, and to determine fourth received signal strengths of one or more fourth wireless packets transmitted by a second wireless station associated with the OBSS as measured at the wireless communication device. Execution of the processor-readable code is configured to transmit or not transmit a fifth wireless packet from the wireless communication device to the first wireless station based on the first, the second, the third, and the fourth received signal strengths.

In some implementations, one or more of the first received signal strengths, the second received signal strengths, the third received signal strengths, or the fourth received signal strengths may be an average received signal strength. In some instances, each of the one or more first wireless packets may be a beacon frame, each of the one or more second wireless packets may be an OBSS packet, and each of the one or more third wireless packets may be an OBSS packet. In some implementations, the one or more second wireless packets may be the same packets as the one or more third wireless packets.

In some implementations, execution of the processor-readable code may be configured to transmit a first request to the first wireless station to measure the first received signal strength of the one or more first wireless packets. In some instances, the first request may be a beacon request, and the first indication may be received in a beacon report responsive to the beacon request. In some other implementations, execution of the processor-readable code may also be configured to transmit a second request to the first wireless station to measure the second received signal strength the one or more second wireless packets. In some instances, the second request may be a frame request, and the second indication may be received in one or more frame reports responsive to the frame request. In some other instances, the second indication may be an average RCPI of the one or more second wireless packets transmitted by the AP.

In some implementations, execution of the processor-readable code may be configured to determine a path loss to the first wireless station based on the first received signal strengths, and to determine a first expected received signal strength for the fifth wireless packet at the first wireless station based at least in part on the determined path loss. In some instances, transmitting or not transmitting the fifth wireless packet may be based at least in part on the first expected received signal strength. In some other implementations, determining the path loss to the first wireless station may include determining an average path loss to the first wireless station over a period of time during which the one or more first wireless packets are transmitted, where the first expected received signal strength may be based on the determined average path loss.

In some implementations, execution of the processor-readable code may be configured to determine a second expected received signal strength at the first wireless station for a wireless packet transmitted by the AP based on the second received signal strengths and the third received signal strengths, where transmitting or not transmitting the fifth wireless packet may be based at least in part on the second expected received signal strength. In some instances, determining the third received signal strengths of the one or more third wireless packets may include determining an average receive power at the wireless communication device based on the third received signal strengths, where the second expected received signal strength may be based at least in part on the second received signal strengths and the determined average receive power.

In some implementations, execution of the processor-readable code may be configured to estimate a transmit power of the second wireless station associated with the OBSS, and to determine an expected received signal strength at the second wireless station for the fifth wireless packet transmitted by the wireless communication device based on the fourth received signal strengths, the estimated transmit power of the second wireless station, and a transmit power of the wireless communication device for the fifth wireless packet. In some instances, transmitting or not transmitting the fifth wireless packet may be based at least in part on the expected received signal strength at the second wireless station for the fifth wireless packet.

In some implementations, execution of the processor-readable code to estimate the transmit power of the second wireless station may be configured to estimate a path loss to each of a plurality of wireless stations in the first BSS, to determine an average receive power at the wireless communication device for wireless packets received from each of the plurality of wireless stations in the first BSS, to estimate an average transmit power for each of the plurality of wireless stations in the first BSS based on the respective estimated path loss, the respective average receive power, and a respective MCS used for transmissions by the respective wireless station, and to estimate the transmit power of the second wireless station based on the estimated average transmit powers of the plurality of wireless stations in the first BSS. The plurality of wireless stations in the first BSS may include the first wireless station. In some instances, estimating the transmit power of the second wireless station may include determining, as the estimated transmit power of the second wireless station, a lowest one of the estimated average transmit powers.

In some implementations, execution of the processor-readable code may be configured to determine a noise floor, where transmitting or not transmitting the fifth wireless packet is further based on determining that a first ratio of the first expected received signal strength to a sum of the second expected received signal strength and the noise floor is greater than a second ratio of the third expected received signal strength to the noise floor.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 20A shows an example Beacon Request usable for wireless communications that support spatial reuse according to some implementations.

FIG. 20B shows an example Beacon Report usable for wireless communications that support spatial reuse according to some implementations.

FIG. 21A shows an example Frame Request element usable for wireless communications that support spatial reuse according to some implementations.

FIG. 21B shows an example Frame Report element usable for wireless communications that support spatial reuse according to some implementations.

Like reference numbers and designations in the various drawings indicate like elements.

DETAILED DESCRIPTION

Figure 1:
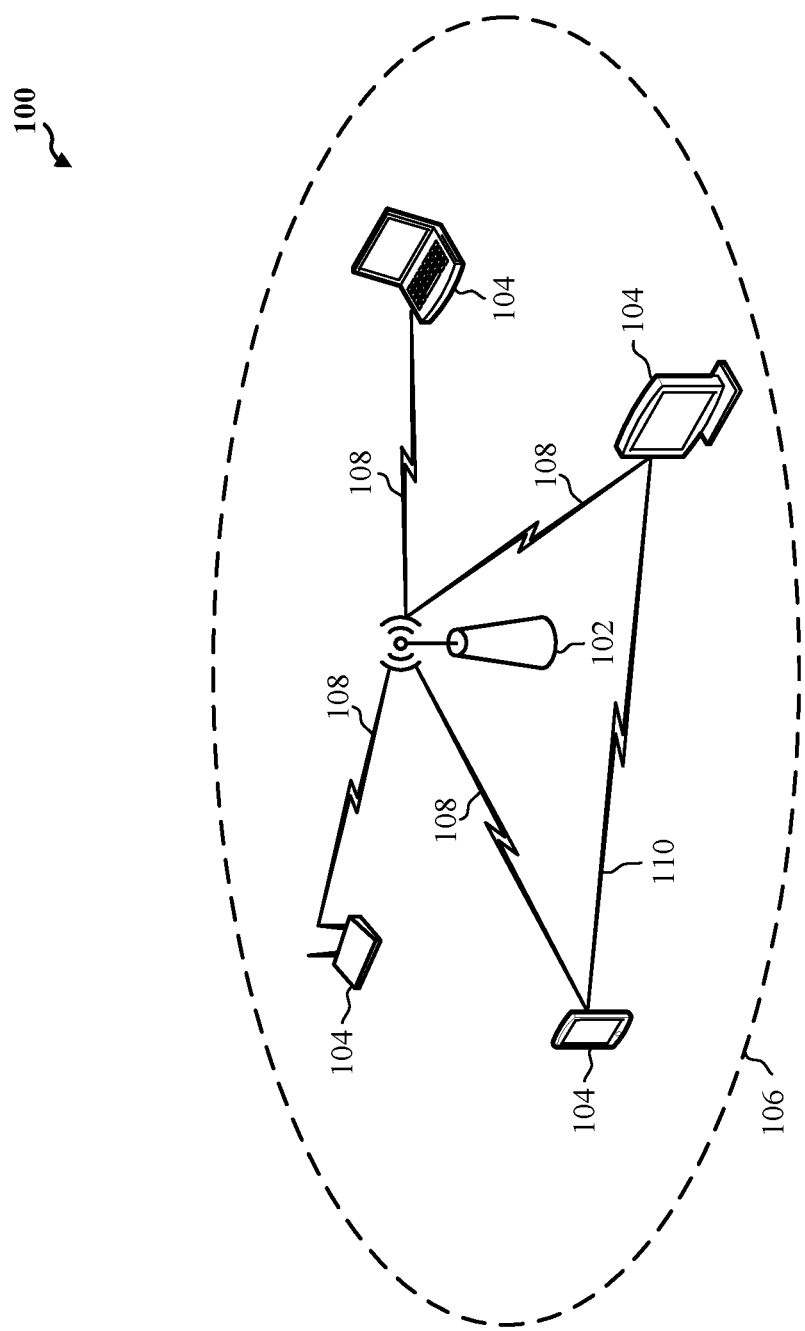
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Typically, a wireless communication device deployed in a basic service set (BSS) considers only the energy received from an overlapping BSS (OBSS) transmission when determining whether to transmit data to one or more other wireless communication devices using a spatial reuse (SR) transmission in the presence of the OBSS transmission. For example, when an access point (AP) associated with a BSS detects a presence of one or more OBSS packets on the wireless medium, the AP typically compares the received energy of the OBSS packets with a threshold to determine whether to transmit data to an associated wireless station (STA) using an SR transmission. Specifically, the AP may transmit data to its associated STA using SR packets when the measured energy of the OBSS packets received at the AP is less than the threshold, and may not transmit data to its associated STAs using SR packets when the measured energy of the OBSS packets received at the AP is greater than the threshold.

When the associated STA is closer to an OBSS receiving device than to the AP, the level of OBSS interference at the associated STA may be greater than the level of OBSS interference at the AP. The difference between the OBSS energy detected at the AP and the OBSS energy detected at its associated STA may, in some instances, allow the AP to use SR transmissions to its associated STA when the OBSS energy detected at the AP is less than the threshold even though the OBSS energy detected at the associated STA is greater than the threshold. In such instances, the OBSS interference may impair or even prevent the associated STA from receiving or successfully decoding the SR packets. The close proximity of the associated STA to the OBSS receiving device may also result in the SR transmission interfering with or disrupting the ongoing OBSS transmission to or from the OBSS receiving device. As such, these SR transmissions may reduce the overall gain or throughput on the wireless medium, even though the OBSS energy detected at the AP may be less than the threshold.

Various aspects of the subject matter disclosed herein relate generally to providing SR opportunities on a wireless medium shared at least partially by multiple wireless communications networks proximate to and independent of one another. The example implementations disclosed herein recognize that the overall gain or throughput on a shared wireless medium can be increased, maintained at a certain level, or maintained within a certain range during SR opportunities by considering not only an OBSS energy level detected at an AP but also the level of OBSS interference detected at one or more receiving devices associated with the AP and at one or more receiving devices associated with an OBSS when determining whether to utilize SR transmissions in the presence of an ongoing OBSS transmission to or from the one or more OBSS receiving devices.

In accordance with various aspects of the present disclosure, a wireless communication device may transmit data to another wireless communication device using SR packets in the presence of an ongoing OBSS transmission only when the signal strength of the SR packets received at the other wireless communication device is greater than an amount of signal degradation of the OBSS packets caused by the SR transmission. For example, in some instances, the wireless communication device may be an AP configured to transmit SR packets to a first STA associated with the AP only when a signal-to-interference plus noise ratio (SINR) of the SR packets received at the first STA is greater than the signal-to-noise ratio (SNR) of OBSS packets received by a second STA associated with the OBSS minus the signal-to-interference ratio (SIR) of the OBSS packets received by the second STA. The SNR of the OBSS packets may indicate the received signal strength of the OBSS packets at the second STA in the absence of SR transmissions, and the SIR of the OBSS packets may indicate the received signal strength of the OBSS packets at the second STA in the absence of noise on the wireless medium. That is, the difference between the SNR of the OBSS packets received at the second STA and the SIR of the OBSS packets received at the second STA may be indicative of the signal degradation of the OBSS packets caused by the SR transmission from the AP to the first STA. Specifically, if the received signal strength of the SR packets at the first STA is greater than the OBSS signal degradation caused by the SR transmission, then the SR transmission may increase the overall gain and throughput on the wireless medium (and may therefore be allowed).

Conversely, if the received signal strength of the SR packets at the first STA is less than the OBSS signal degradation caused by the SR transmission, then the SR transmission may decrease the overall gain and throughput on the wireless medium (and therefore may not be allowed).

Particular implementations of the subject matter described in this disclosure can be implemented to realize one or more of the following potential advantages. As described above, by configuring an AP to transmit SR packets to an associated STA in the presence of an ongoing OBSS transmission only when the signal strength of the SR packets received at the associated STA is greater than an amount of signal degradation of the OBSS transmission caused by transmission of the SR packets, aspects of the present disclosure may ensure that the overall gain or throughput on the wireless medium is not degraded by SR transmissions. In some instances, the overall gain or throughput on the wireless medium may be increased when an AP employing various aspects of the present disclosure transmits SR packets to one or more associated STAs in the presence of an ongoing OBSS transmission.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
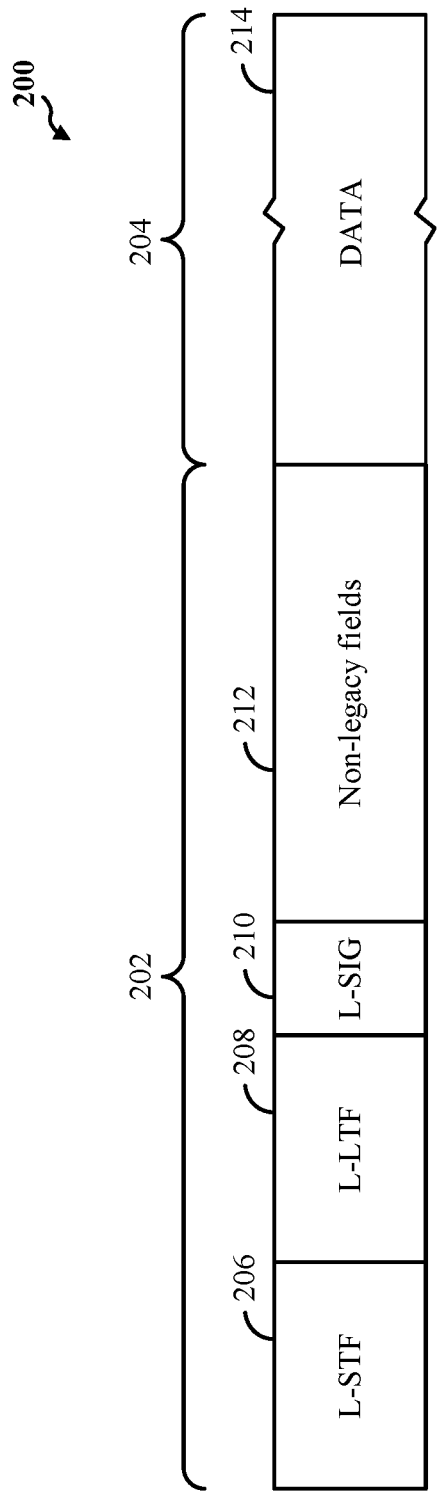
FIG. 2A shows an example protocol data unit (PDU) usable for communications between an access point (AP) and a number of stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
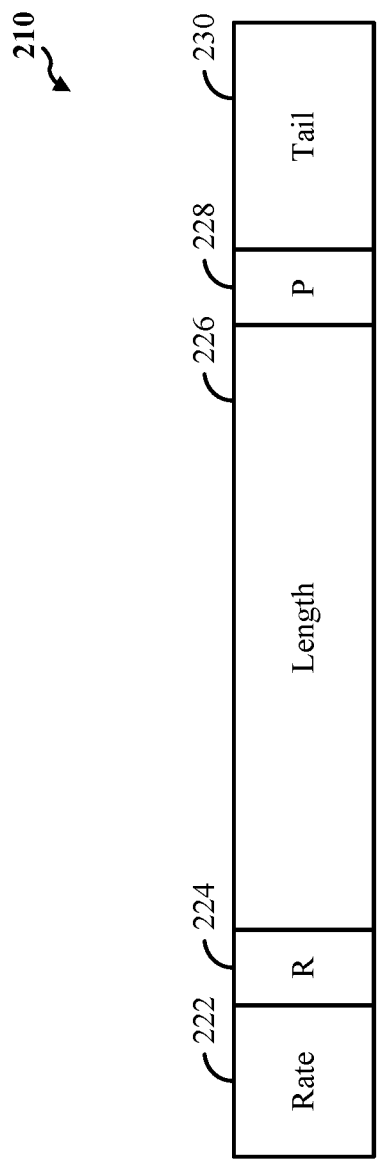
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
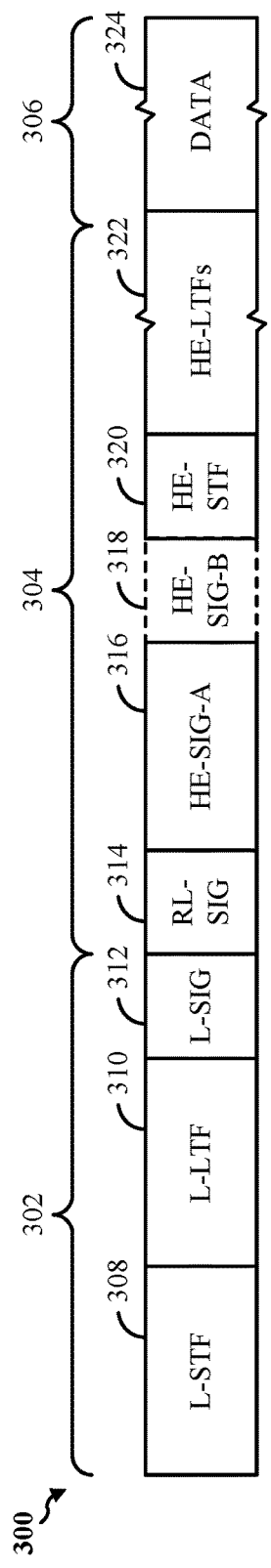
FIG. 3A shows an example physical layer (PHY) preamble usable for communications between an AP and each of a number of STAs.

FIG. 3A shows an example PHY preamble 300 usable for wireless communication between an AP and one or more STAs. The PHY preamble 300 may be used for SU, OFDMA or MU-MIMO transmissions. The PHY preamble 300 may be formatted as a High Efficiency (HE) WLAN PHY preamble in accordance with the IEEE 802.11ax amendment to the IEEE 802.11 wireless communication protocol standard. The PHY preamble 300 includes a legacy portion 302 and a non-legacy portion 304. The PHY preamble 300 may be followed by a PHY payload 306, for example, in the form of a PSDU including a data field 324.

The legacy portion 302 of the PHY preamble 300 includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU carrying the PHY preamble 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
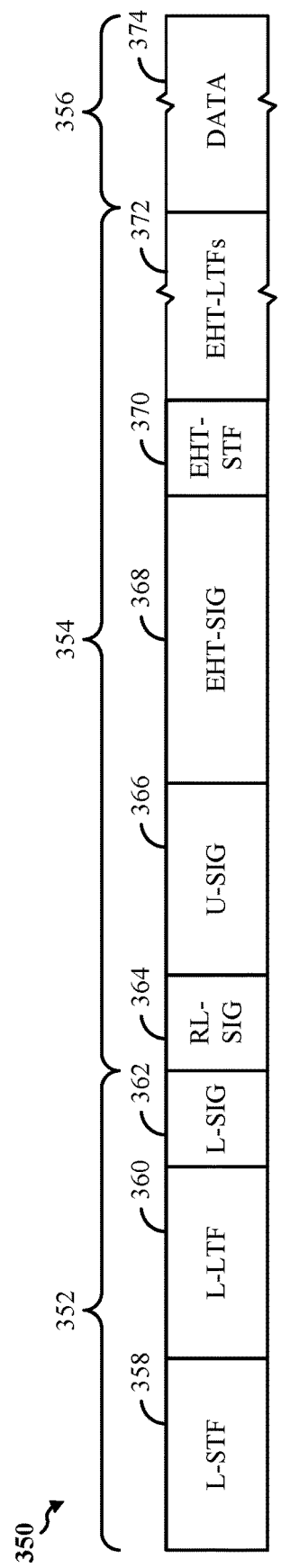
FIG. 3B shows another example PHY preamble usable for communications between an AP and each of a number of stations.

FIG. 3B shows another example PHY preamble 350 usable for wireless communication between an AP and one or more STAs. The PHY preamble 350 may be used for SU, OFDMA or MU-MIMO transmissions. The PHY preamble 350 may be formatted as an Extreme High Throughput (EHT) WLAN PHY preamble in accordance with the IEEE 802.11be amendment to the IEEE 802.11 wireless communication protocol standard, or may be formatted as a PHY preamble conforming to any later (post-EHT) version of a new wireless communication protocol conforming to a future IEEE 802.11 wireless communication protocol standard or other wireless communication standard. The PHY preamble 350 includes a legacy portion 352 and a non-legacy portion 354. The PHY preamble 350 may be followed by a PHY payload 356, for example, in the form of a PSDU including a data field 374.

The legacy portion 352 of the PHY preamble 350 includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PDU carrying the PHY preamble 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 3C:
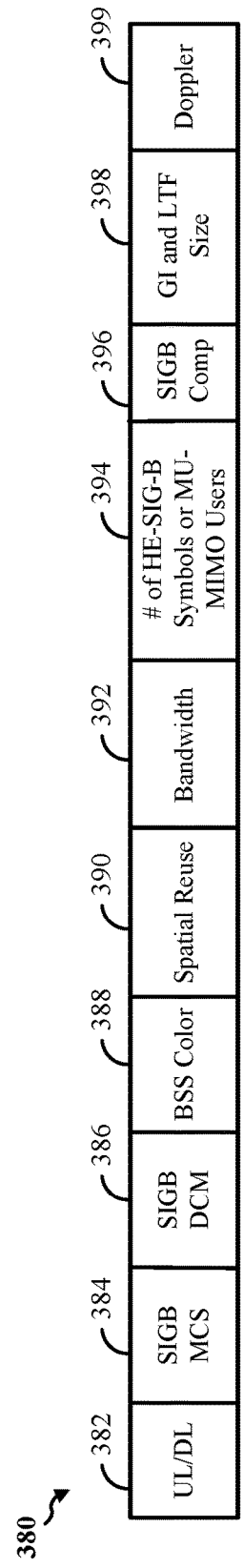
FIG. 3C shows an example signal field that may be carried in a PDU.

FIG. 3C shows an example signal field 380 that may be carried in a WLAN PPDU. In implementations for which the signal field 380 is carried in an HE PPDU, the signal field 380 may be, or may correspond to, a HE-SIG-A field (such as the HE-SIG-A field 316 of the preamble 300 of FIG. 3A). In implementations for which the signal field 380 is carried in an EHT PPDU, the signal field 380 may be, or may correspond to, an EHT-SIG field (such as the EHT-SIG 368 of the preamble 350 of FIG. 3B). The signal field 380 may include an UL/DL subfield 382 indicating whether the PPDU is sent UL or DL, may include a SIGB-MCS subfield 384 indicating the MCS for the HE-SIG-B 318, and may include a SIGB DCM subfield 386 indicating whether or not the HE-SIG-B 318 is modulated with dual carrier modulation (DCM). The signal field 380 may further include a BSS color field 388 indicating a BSS color identifying the BSS. Each device in a BSS may identify itself with the same BSS color. Thus, receiving a transmission having a different BSS color indicates the transmission is from another BSS, such as an OBSS.

The signal field 380 may further include a spatial reuse subfield 390 indicating whether spatial reuse is allowed during transmission of the corresponding PPDU. The signal field 380 may further include a bandwidth subfield 392 indicating a bandwidth of the PPDU data field, such as 20 MHz, 40 MHz, 80 MHz, 160 MHZ, and so on. The signal field 380 may further include a number of HE-SIG-B symbols or MU-MIMO users subfield 394 indicating either a number of OFDM symbols in the HE-SIG-B field or a number of MU-MIMO users. The signal field 380 may further include a SIGB compression subfield 396 indicating whether or not a common signaling field is present, may include a GI+LTF size subfield 398 indicating the guard interval (GI) duration and the size of the non-legacy LTFs. The signal field 380 may further include a doppler subfield 399 indicating whether a number of OFDM symbols in the PPDU data field is larger than a signaled midamble periodicity plus one, and the midamble is present, or that the number of OFDM symbols in the PPDU data field is less than or equal to the signaled midamble periodicity plus 1, that the midamble is not present, but that the channel is fast varying.

Figure 4:
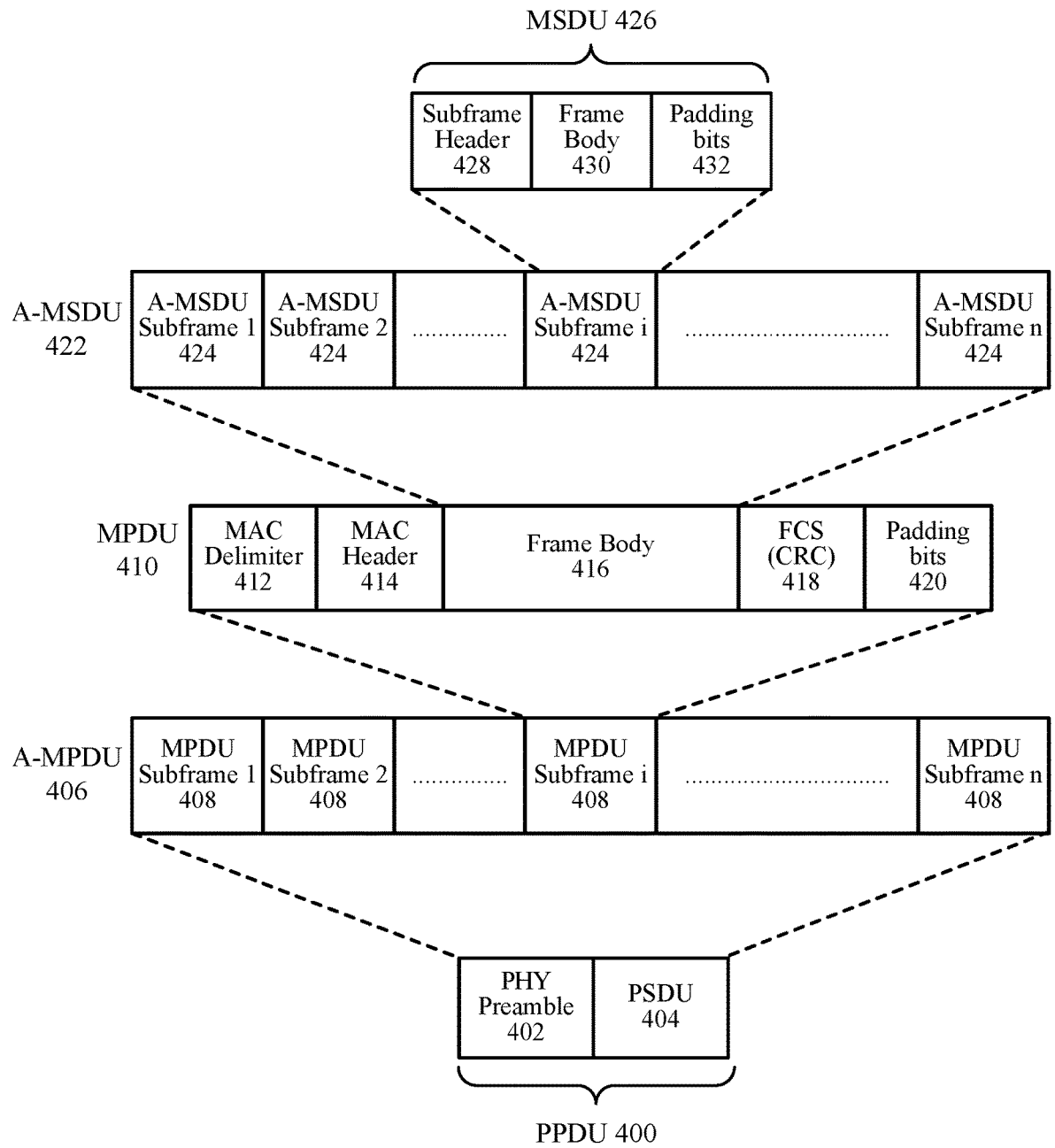
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUS) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
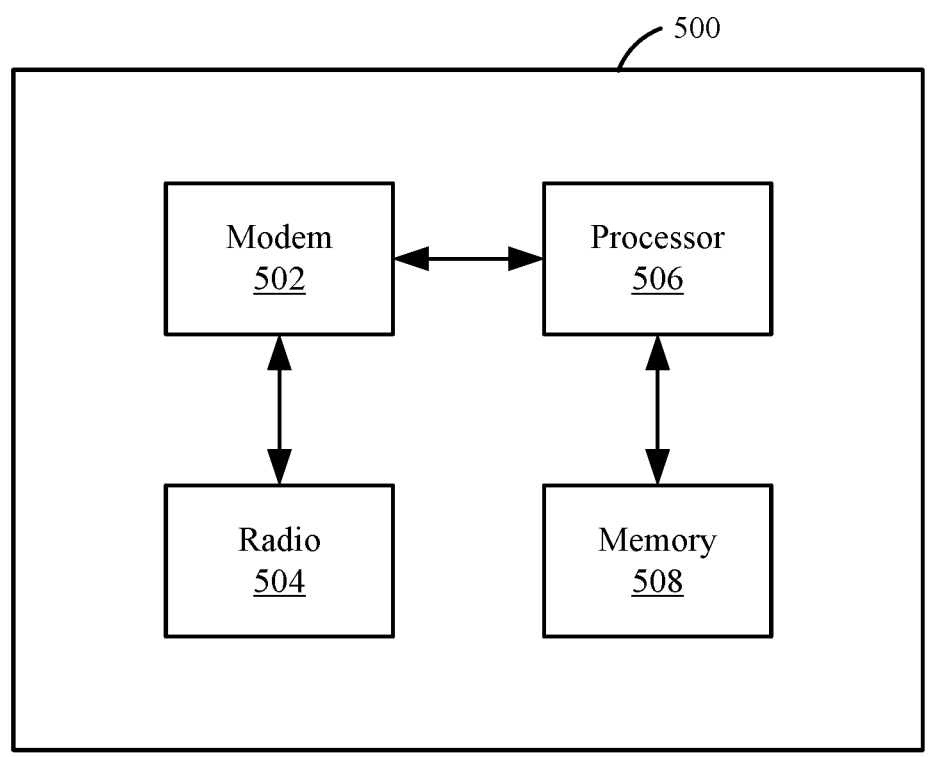
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
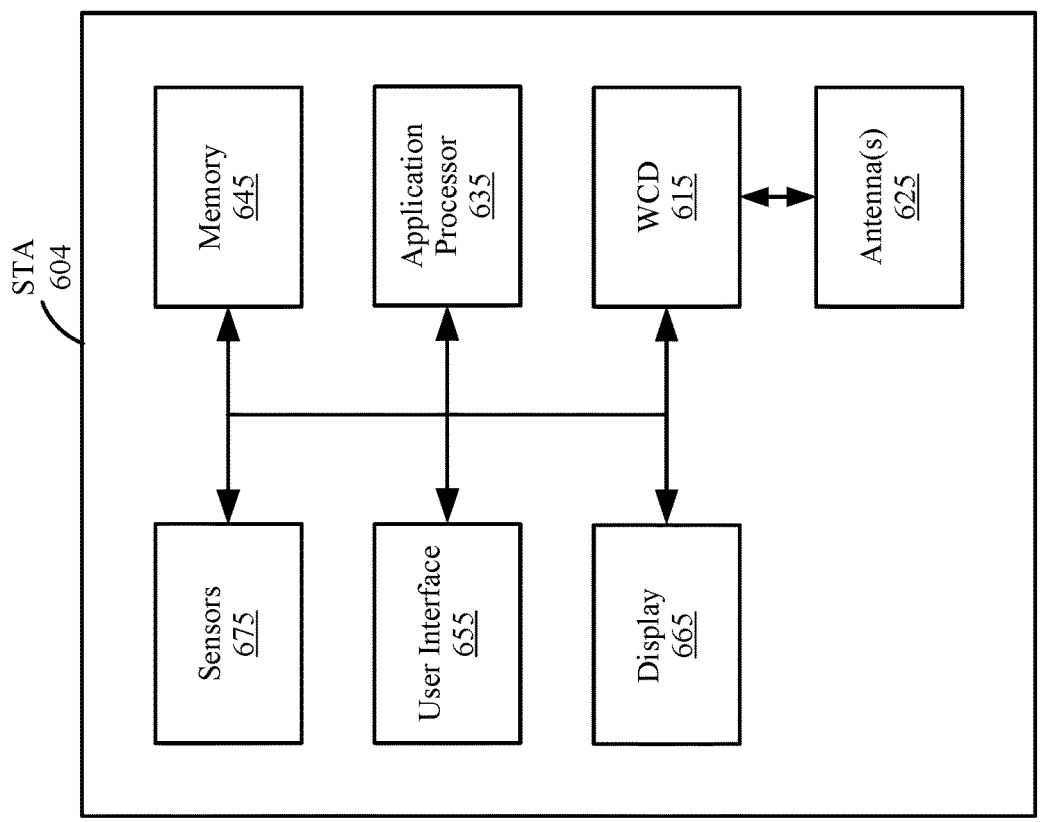
FIG. 6B shows a block diagram of an example STA.
Figure 6A:
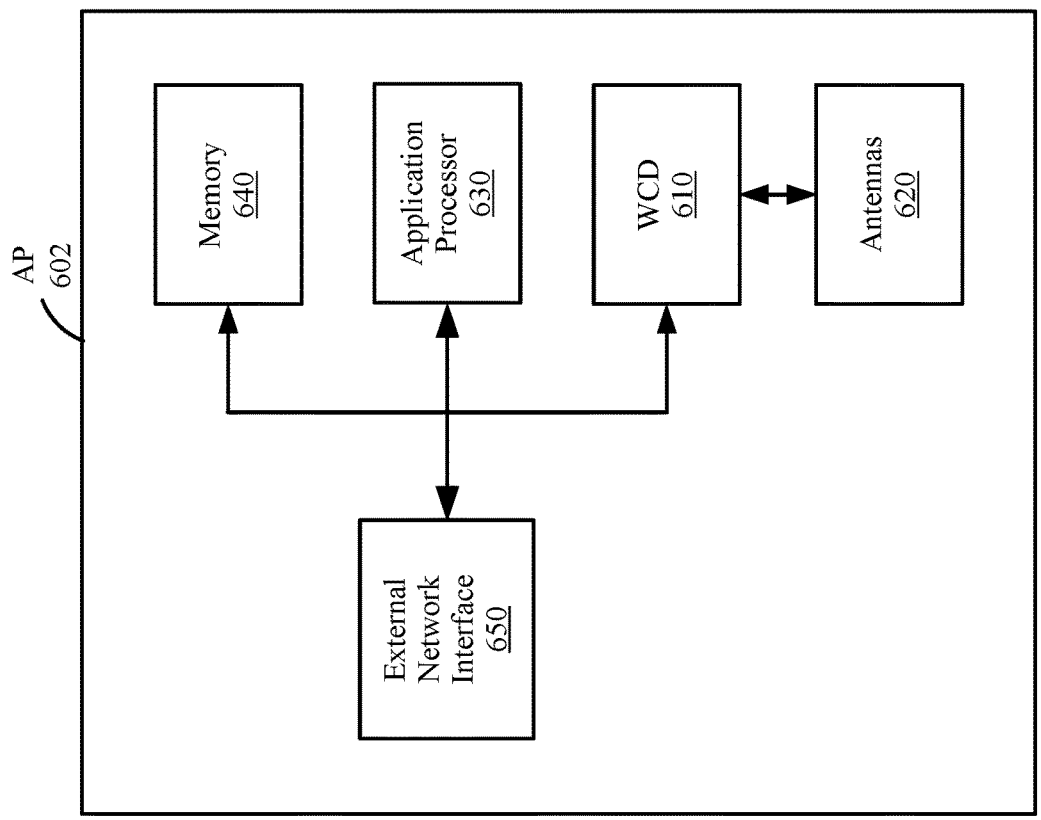
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Conventional SR techniques may be used to increase medium utilization and throughput by allowing a wireless communication device belonging to a first BSS to transmit SR packets to one or more other wireless communication devices in the first BSS during an OBSS transmission when the energy level of the OBSS transmission detected at the wireless communication device is less than a threshold. In some instances, the threshold may correspond to an OBSS PD threshold defined by one or more amendments to the IEEE 802.11 family of standards for wireless communication. As discussed, the wireless communication device typically considers only the level of OBSS energy detected at the wireless communication device when determining whether to use spatial reuse in the presence of OBSS transmissions. Specifically, when an AP associated with a first BSS detects a presence of one or more OBSS packets on the wireless medium, the AP is typically allowed to transmit data to an associated STA using an SR transmission as long as the level of OBSS energy received at the AP is less than the threshold. When the associated STA is closer to an OBSS receiving device than is the AP, the level of OBSS interference at the associated STA may be greater than the level of OBSS interference at the AP. In some instances, the difference between the OBSS energy level detected at the AP and the OBSS energy level detected at the associated STA may result in the AP transmitting SR packets to the associated STA during an ongoing OBSS transmission even when the OBSS energy level detected at the associated STA is greater than the threshold (which typically indicates that the OBSS transmission is strong enough to disrupt the SR transmission). In such instances, the OBSS transmission may impair or even prevent the associated STA from receiving and successfully decoding the SR packets, and the SR transmission may interfere with or disrupt the OBSS transmission. As such, these SR transmissions may reduce the overall gain or throughput on the wireless medium, even though the OBSS energy level detected at the AP may be less than the threshold.

The example implementations disclosed herein recognize that the overall gain or throughput on a wireless medium can be increased (or at least maintained at a certain level or within a certain range) during SR opportunities by considering not only the OBSS energy detected at the AP but also the level of OBSS interference detected at one or more receiving devices in the first BSS and at one or more receiving devices in the OBSS when determining whether to utilize SR transmissions in the presence of an ongoing OBSS transmission. In accordance with various aspects of the present disclosure, a wireless communication device may transmit data to another wireless communication device using SR packets in the presence of an ongoing OBSS transmission only when the signal strength of SR packets received at the other wireless communication device is greater than an amount of signal degradation of the OBSS packets that would be caused by the SR transmission.

In some implementations, a first AP associated with a first BSS may transmit SR packets to a first STA associated with the first BSS only when a signal-to-interference plus noise ratio (SINR) of the SR packets received at the first STA is greater than the signal-to-noise ratio (SNR) of OBSS packets received by a second STA associated with the OBSS minus the signal-to-interference ratio (SIR) of the OBSS packets received by the second STA. The SNR of the OBSS packets may indicate the received signal strength of the OBSS packets at the second STA in the absence of an interfering SR transmission, and the SIR of the OBSS packets may indicate the received signal strength of the OBSS packets at the second STA in the absence of noise on the wireless medium. The difference between the SNR of the OBSS packets received at the second STA and the SIR of the OBSS packets received at the second STA may be indicative of an amount of signal degradation of the OBSS packets caused by the SR transmission.

Thus, if the received signal strength of SR packets at the first STA is greater than the amount of OBSS signal degradation caused by an SR transmission, then the SR transmission may increase the overall gain and throughput on the wireless medium (and therefore may be allowed). Conversely, if the received signal strength of the SR packets at the first STA is less than the amount of OBSS signal degradation caused by the SR transmission, then the SR transmission may decrease the overall gain and throughput on the wireless medium (and therefore may not be allowed).

In this way, implementations of the subject matter disclosed herein may ensure that the overall gain or throughput on a wireless medium is increased (or at least maintained at a certain level or within a certain range) when a wireless communication device utilizes SR transmissions in the presence of an ongoing OBSS transmission.

For the examples discussed herein, the first BSS and the OBSS may be sufficiently proximate to one another such that the transmission of packets (such as intra-BSS packets and SR packets) between wireless devices associated with the first BSS can interfere with the transmission of packets (such as OBSS packets) between wireless devices associated with the OBSS, and the transmission of packets between wireless devices associated with the OBSS can interfere with the transmission of packets between wireless devices associated with the first BSS. The first BSS may be operated by the first AP, and may include any number of first wireless communication devices (such as the first STA). The OBSS may be operated by a second AP, and may include any number of second wireless communication devices (such as the second STA).

In some implementations, the first AP may estimate a received signal strength of an SR packet at the first STA, may estimate a received signal strength of the SR packet at the second STA, and may estimate a received signal strength of one or more OBSS packets at the first STA. The first AP may determine an SINR of the SR packet at the first STA based on a ratio of the estimated received signal strength of the SR packet at the first STA to the estimated received signal strength of the OBSS packets at the first STA. The first AP may also determine an SNR of the OBSS packets received at the second STA, and may determine an SIR of the OBSS packets received at the second STA. The determined SINR of the SR packet may be indicative of the signal strength of the SR packet as received by the first STA in the presence of OBSS interference. The determined SNR of the OBSS packets may be indicative of the signal strength of the OBSS packets received by the second STA in the absence of SR transmissions, and the determined SIR of the OBSS packets may be indicative of the signal strength of the OBSS packets received by the second STA in the absence of noise on the wireless medium. In this way, the difference between the SNR of the OBSS packets received at the second STA and the SIR of the OBSS packets received at the second STA may be indicative of an amount of signal degradation of the OBSS packets caused by an SR transmission.

In some implementations, the first AP may transmit the SR packet to the first STA during ongoing OBSS transmissions between the second AP and the second STA when the SINR of the SR packet received at the first STA is greater than the difference between the SNR and the SIR of the OBSS packets received by the second STA. For example, if the received signal strength of an SR transmission at the first STA is greater than the amount of OBSS signal degradation caused by the SR transmission (which indicates that the SR transmission may increase the overall gain and throughput on the wireless medium), then the first AP may transmit SR packets to the first STA during the ongoing OBSS transmission. Conversely, if the received signal strength of the SR transmission at the first STA is less than the amount of OBSS signal degradation caused by the SR transmission (which indicates that the SR transmission may decrease the overall gain and throughput on the wireless medium), then the first AP may not transmit SR packets to the first STA during the ongoing OBSS transmission.

In other words, the first AP may utilize SR transmissions during an ongoing OBSS transmission when $SINR_1 > SNR_2 - SIR_2$, where $SINR_1$ is indicative of the received signal strength of the SR packet at the first STA, $SNR_2$ is indicative of the received signal strength of the OBSS packet at the second STA without interference from the SR transmission, and $SIR_2$ is indicative of the received signal strength of the OBSS packet at the second STA in an absence of noise on the wireless medium. By allowing SR transmissions in the presence of an ongoing OBSS transmission only when the received signal strength of the SR packets at the first STA is greater than the amount of OBSS signal degradation at the second STA caused by the SR transmission, aspects of the subject matter disclosed herein may ensure that the overall gain or throughput on the wireless medium is increased (or at least maintained at a certain level or within a certain range) by SR transmissions.

The example implementations disclosed herein recognize that the expression $SINR_1 > SNR_2 - SIR_2$ can be represented as $$\frac{S_{AP1 \to STA1}}{S_{AP2 \to STA1} + N} >= \frac{S_{AP1 \to STA2}}{N},$$

where $S_{AP1 \to STA1}$ is indicative of the received signal strength of the SR packet at the first STA, $S_{AP2 \to STA1}$ is indicative of the interference at the first STA caused by the OBSS transmission, $S_{AP1 \to STA2}$ is indicative of the received signal strength of the SR packet at the second STA, and N represents a level of noise on the wireless medium. In some instances, the first AP may determine a noise floor of the wireless medium, and may determine whether to transmit the SR packet to the first STA based on a first ratio of an expected received signal strength of the SR packet at the first STA to a sum of an expected received signal strength of the OBSS packets at the first STA and the noise floor relative to a second ratio of an expected received signal strength of the SR packet at the second STA to the noise floor. That is, the first AP may transmit the SR packet when $$\frac{S_{AP1 \to STA1}}{S_{AP2 \to STA1} + N} >= \frac{S_{AP1 \to STA2}}{N},$$

and may not transmit the SR packet when $$\frac{S_{AP1 \to STA1}}{S_{AP2 \to STA1} + N} < \frac{S_{AP1 \to STA2}}{N}.$$

In some implementations, the first AP may use measurement frames such as beacon requests and beacon reports to solicit received signal strength measurements of one or more beacon frames from each of its associated STAs, and may estimate the path loss between the first AP and each of the associated STAs based on the respective received signal strength measurements. In some instances, the first AP may determine the path loss to a particular STA based on a difference between the transmit power used by the first AP to transmit a frame to the particular STA and the received signal strength of the frame at the particular STA. The first AP may then determine a value for $S_{AP1 \to STA1}$ based on the estimated path losses to each of its associated STAs.

In some implementations, the first AP may use measurement frames such as frame requests and frame reports to solicit received channel power indicator (RCPI) values for OBSS packets transmitted by the second AP and received by each of its associated STAs. In some instances, each of the associated STAs may report an average RCPI value of the received OBSS packets, and the first AP may determine a value for $S_{AP2 \to STA1}$ based on the average RCPIs provided by its associated STAs. In some other instances, the first AP may determine the value for $S_{AP2 \to STA1}$ based on a sum of the average RCPI value of the OBSS packets received by its associated STAs and the instantaneous RCPI value of the OBSS packets received by the first AP minus the average RCPI value of the OBSS packets received by the first AP. The difference between the instantaneous RCPI value of the OBSS packets received by the first AP and the average RCPI value of the OBSS packets received by the first AP may be used as a correction factor to compensate for different transmit power levels used by the second AP to transmit different OBSS packets.

The example implementations disclosed herein also recognize that the level of interference at the second STA resulting from an SR transmission by the first AP can be expressed as $S_{AP1 \to STA2} = T_{AP1} + S_{STA2 \to AP1} - T_{STA2}$, where $T_{AP1}$ represents the transmit power of the first AP, $S_{STA2 \to AP1}$ represents the received signal strength of OBSS packets transmitted by the second STA and received by the first AP, and $T_{STA2}$ represents the transmit power of the second STA. The difference between the received signal strength of the OBSS packets at the first AP and the transmit power of the second STA, denoted as $S_{STA2 \to AP1} - T_{STA2}$, may be indicative of the path loss from the second STA to the first AP. In some instances, the first AP may use measurement frames such as beacon requests and beacon reports to solicit received signal strength measurements of beacon frames from each of its associated STAs, and may estimate an average path loss between the first AP and its associated STAs based on a difference between the transmit power of the first AP (denoted above as $T_{AP1}$) and the received signal strengths of the beacon frames measured by its associated STAs.

In some implementations, the first AP may estimate the average transmit power $T_{STA1}$ used by its associated STAs based on a sum of the received signal strengths measured by the first AP and the determined average path loss between the first AP and its associated STAs. Because the STAs associated with the OBSS are likely to use transmit power levels similar to the transmit power levels used by the STAs associated with the first BSS, the first AP can use the average transmit power $T_{STA1}$ determined for its associated STAs as an approximation of the transmit power $T_{STA2}$ of the second STA. In some instances, the first AP can express the transmit power $T_{STA2}$ of the second STA as a function of the data rate or MCS used by the second STA, and then select the minimum of the average transmit powers of the first STAs as the approximation of the transmit power of the second STA. Finally, the first AP may estimate the value of $S_{AP1 \to STA2}$ (and thus the difference value $SNR_2 - SIR_2$)=as $S_{AP1 \to STA2} - N$, where N represents the noise floor of the wireless medium.

Figure 7:
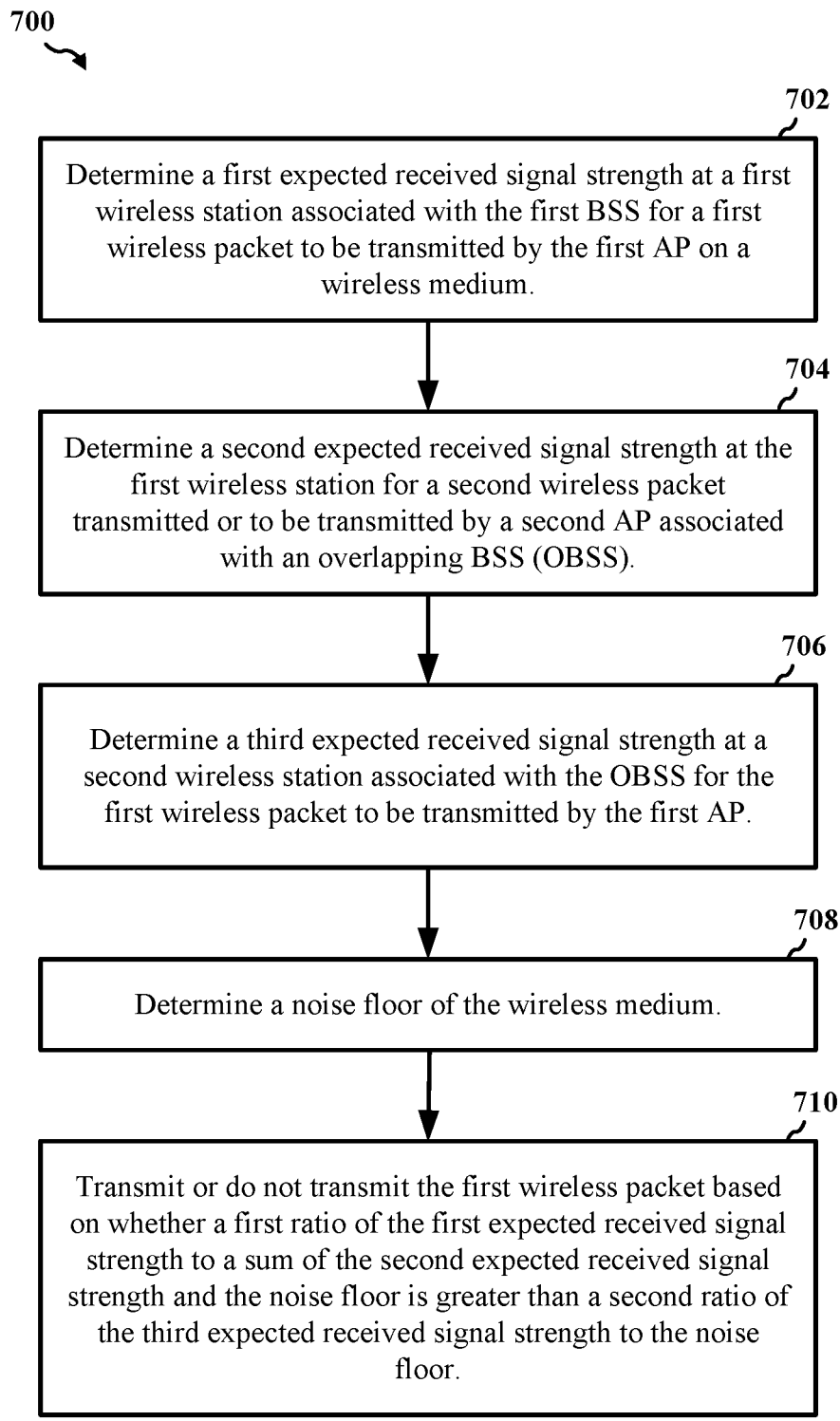
FIG. 7 shows a flowchart illustrating an example operation for wireless communication that supports spatial reuse according to some implementations.

FIG. 7 shows a flowchart illustrating an example operation 700 for wireless communication that supports spatial reuse according to some implementations. The operation 700 may be performed by a wireless communication device such as the wireless communication device 500 described above with reference to FIG. 5. In some implementations, the operation 700 may be performed by a wireless communication device operating as or within an AP, such as one of the APs 102 and 602 described above with reference to FIGS. 1 and 6A, respectively. In the example of FIG. 7, the operation 700 is performed by a first AP associated with a first BSS.

At block 702, the first AP determines a first expected received signal strength at a first wireless station (STA) associated with the first BSS for a first wireless packet to be transmitted by the first AP on a wireless medium. At block 704, the first AP determines a second expected received signal strength at the first STA for a second wireless packet transmitted or to be transmitted by a second AP associated with an overlapping BSS (OBSS). At block 706, the first AP determines a third expected received signal strength at a second STA associated with the OBSS for the first wireless packet to be transmitted by the first AP. At block 708, the first AP determines a noise floor of the wireless medium. At block 710, the first AP transmits or does not transmit the first wireless packet based on whether a first ratio of the first expected received signal strength to a sum of the second expected received signal strength and the noise floor is greater than a second ratio of the third expected received signal strength to the noise floor.

In some instances, the first AP may transmit the first wireless packet as an SR packet to the first STA in the presence of an ongoing OBSS transmission only when the received signal strength of the SR packet at the first STA is greater than the OBSS signal degradation at the second STA caused by the SR transmission. That is, the first AP may transmit the SR packet when $$\frac{S_{AP1 \to STA1}}{S_{AP2 \to STA1} + N} >= \frac{S_{AP1 \to STA2}}{N},$$

and may not transmit the SR packet when $$\frac{S_{AP1 \to STA1}}{S_{AP2 \to STA1} + N} < \frac{S_{AP1 \to STA2}}{N}.$$

Figure 8A:
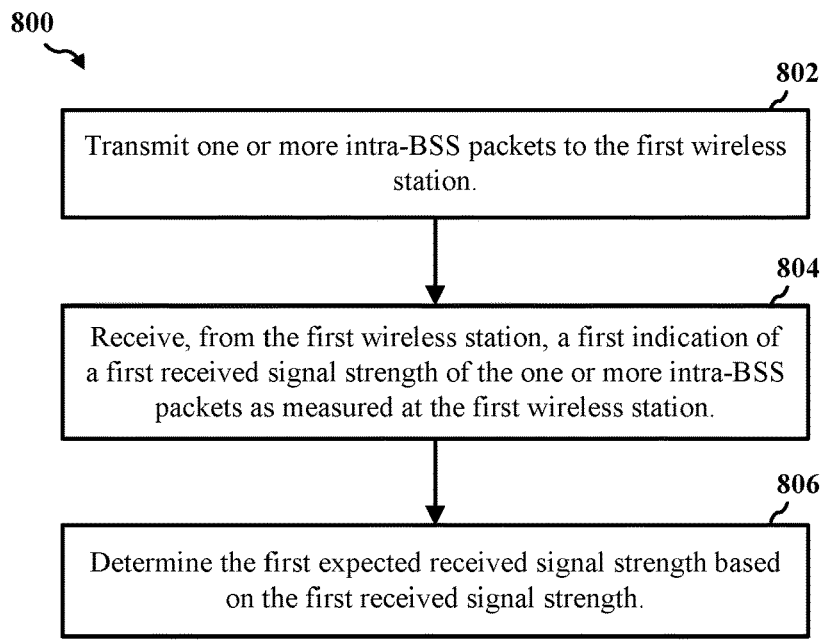
FIG. 8A shows a flowchart illustrating an example operation for wireless communication that supports spatial reuse according to some implementations.

FIG. 8A shows a flowchart illustrating an example operation 800 for wireless communication that supports spatial reuse according to some implementations. The operation 800 may be performed by a wireless communication device such as the wireless communication device 500 described above with reference to FIG. 5. In some implementations, the operation 800 may be performed by a first wireless communication device operating as or within an AP, such as one of the APs 102 and 602 described above with reference to FIGS. 1 and 6A, respectively. In the example of FIG. 8A, the operation 800 is performed by the first AP associated with the first BSS.

In some implementations, the operation 800 may be an example of determining the first expected received signal strength in block 702 of FIG. 7. For example, at block 802, the first AP transmits one or more intra-BSS packets to the first STA. At block 804, the first AP receives, from the first STA, a first indication of a first received signal strength of the one or more intra-BSS packets as measured at the first STA. At block 806, the first AP determines the first expected received signal strength based on the first received signal strength determined by the first STA. In some instances, the one or more intra-BSS packets may be beacon frames, and the first AP may use beacon requests and beacon reports to solicit received signal strength measurements of the beacon frames from each of its associated STAs.

Figure 8B:
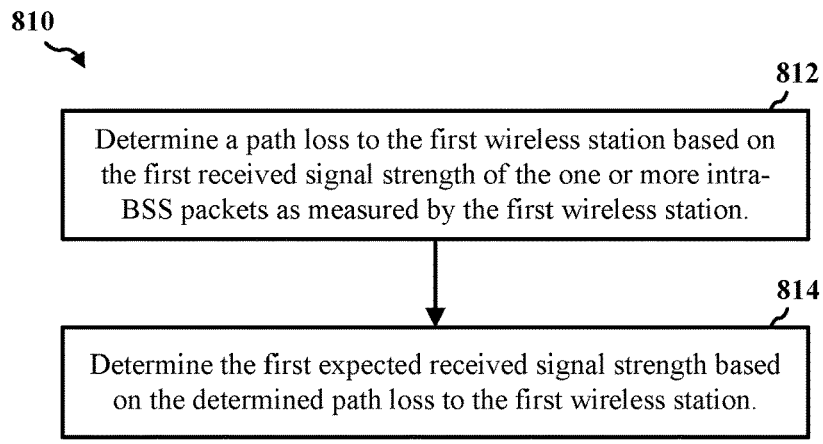
FIG. 8B shows a flowchart illustrating an example operation for wireless communication that supports spatial reuse according to some implementations.

FIG. 8B shows a flowchart illustrating an example operation 810 for wireless communication that supports spatial reuse according to some implementations. The operation 810 may be performed by a wireless communication device such as the wireless communication device 500 described above with reference to FIG. 5. In some implementations, the operation 810 may be performed by a wireless communication device operating as or within an AP, such as one of the APs 102 and 602 described above with reference to FIGS. 1 and 6A, respectively. In the example of FIG. 8B, the operation 810 is performed by the first AP associated with the first BSS.

In some implementations, the operation 810 may be another example of determining the first expected received signal strength in block 702 of FIG. 7. In some other implementations, the operation 810 may be an example of determining the first expected received signal strength in block 806 of FIG. 8A. For example, at block 812, the first AP determines a path loss to the first STA based on the first received signal strength of the one or more intra-BSS packets as measured by the first STA. At block 814, the first AP determines the first expected received signal strength based on the determined path loss to the first STA.

Figure 8C:
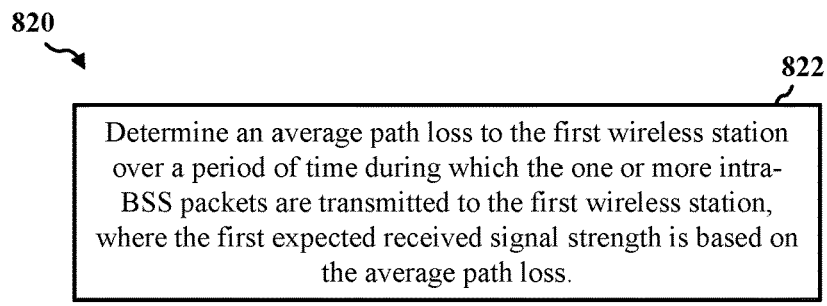
FIG. 8C shows a flowchart illustrating an example operation for wireless communication that supports spatial reuse according to some implementations.

FIG. 8C shows a flowchart illustrating an example operation 820 for wireless communication that supports spatial reuse according to some implementations. The operation 820 may be performed by a wireless communication device such as the wireless communication device 500 described above with reference to FIG. 5. In some implementations, the operation 820 may be performed by a wireless communication device operating as or within an AP, such as one of the APs 102 and 602 described above with reference to FIGS. 1 and 6A, respectively. In the example of FIG. 8C, the operation 820 is performed by the first AP associated with the first BSS.

In some implementations, the operation 820 may be an example of determining the path loss in block 812 of FIG. 8B. For example, at block 822, the first AP determines an average path loss to the first STA over a period of time during which the one or more intra-BSS packets are transmitted to the first STA. In some instances, the first expected received signal strength may be based on the average path loss between the first AP and the first STA.

Figure 8D:
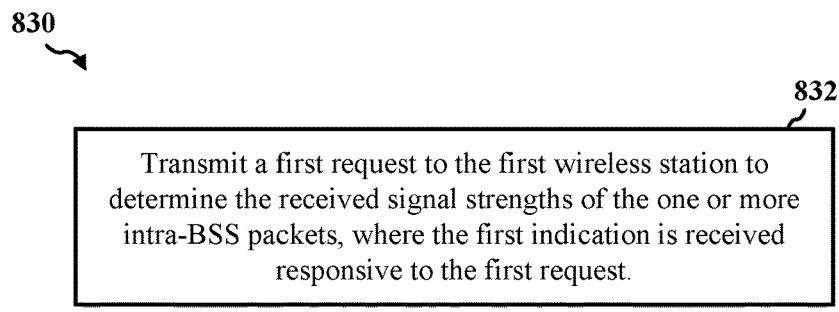
FIG. 8D shows a flowchart illustrating an example operation for wireless communication that supports spatial reuse according to some implementations.

FIG. 8D shows a flowchart illustrating an example operation 830 for wireless communication that supports spatial reuse according to some implementations. The operation 830 may be performed by a wireless communication device such as the wireless communication device 500 described above with reference to FIG. 5. In some implementations, the operation 830 may be performed by a wireless communication device operating as or within an AP, such as one of the APs 102 and 602 described above with reference to FIGS. 1 and 6A, respectively. In the example of FIG. 8D, the operation 830 is performed by the first AP associated with the first BSS.

In some implementations, the operation 830 may be performed in conjunction with determining the first expected received signal strength in block 702 of FIG. 7. In some other implementations, the operation 830 may be performed in conjunction with determining the first expected received signal strength in block 806 of FIG. 8A. For example, at block 832, the first AP transmits a first request to the first STA to measure the received signal strengths of the one or more intra-BSS packets. As discussed, in some instances, the one or more intra-BSS packets may be beacon frames, and the first AP may transmit a beacon request for the first STA to measure the received signal strength of a beacon frame. The first STA may measure the received signal strength of the beacon frame, and report the measured signal strength of the beacon frame to the first AP in a beacon report.

Figure 9A:
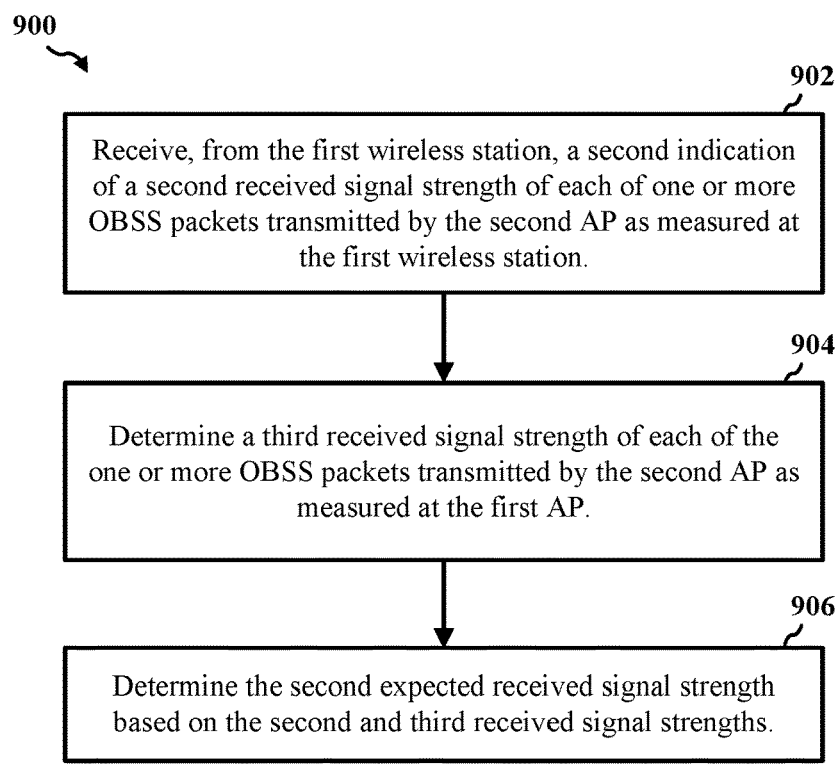
FIG. 9A shows a flowchart illustrating an example operation for wireless communication that supports spatial reuse according to some implementations.

FIG. 9A shows a flowchart illustrating an example operation 900 for wireless communication that supports spatial reuse according to some implementations. The operation 900 may be performed by a wireless communication device such as the wireless communication device 500 described above with reference to FIG. 5. In some implementations, the operation 900 may be performed by a wireless communication device operating as or within an AP, such as one of the APs 102 and 602 described above with reference to FIGS. 1 and 6A, respectively. In the example of FIG. 9A, the operation 900 is performed by the first AP associated with the first BSS.

In some implementations, the operation 900 may be an example of determining the second expected received signal strength in block 704 FIG. 7. For example, at block 902, the first AP receives, from the first STA, a second indication of a second received signal strength of each of one or more OBSS packets transmitted by the second AP and received by the first STA. At block 904, the first AP determines a third received signal strength of each of the one or more OBSS packets transmitted by the second AP and received by the first AP. At block 906, the first AP determines the second expected received signal strength based on the second and third received signal strengths.

Figure 9B:
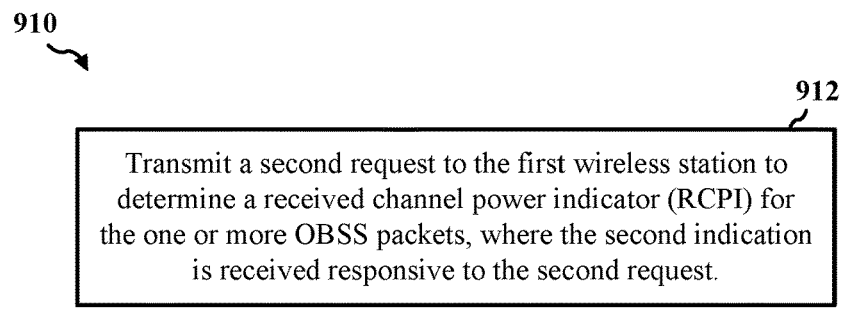
FIG. 9B shows a flowchart illustrating an example operation for wireless communication that supports spatial reuse according to some implementations.

FIG. 9B shows a flowchart illustrating an example operation 910 for wireless communication that supports spatial reuse according to some implementations. The operation 910 may be performed by a wireless communication device such as the wireless communication device 500 described above with reference to FIG. 5. In some implementations, the operation 910 may be performed by a wireless communication device operating as or within an AP, such as one of the APs 102 and 602 described above with reference to FIGS. 1 and 6A, respectively. In the example of FIG. 9B, the operation 910 is performed by the first AP associated with the first BSS.

In some implementations, the operation 910 may be performed in conjunction with receiving the second indication in block 902 of FIG. 9A. For example, at block 912, the first AP transmits a second request to the first STA to measure a Received Channel Power Indicator (RCPI) value for the one or more OBSS packets transmitted by the second AP. In some instances, the first AP may transmit a frame request for the first STA to measure the RCPI value of each packet received or detected by the first STA, and the first STA may report the measured RCPI values to the first AP in one or more frame reports.

Figure 9C:
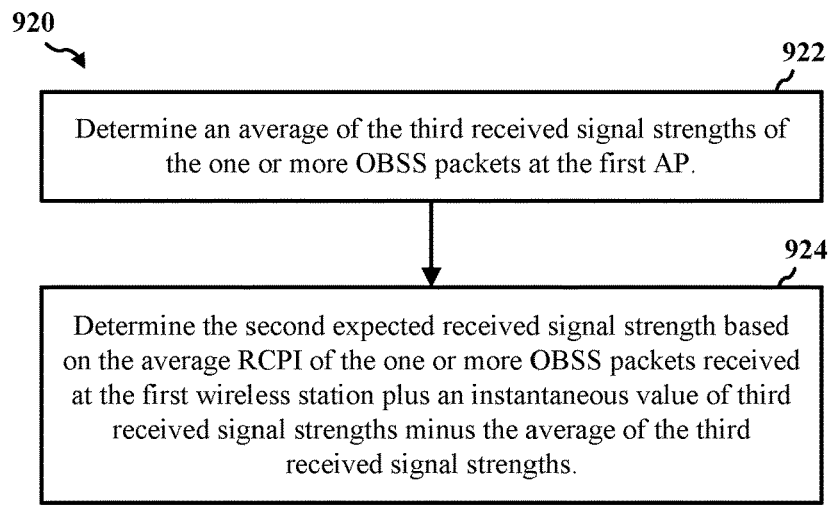
FIG. 9C shows a flowchart illustrating an example operation for wireless communication that supports spatial reuse according to some implementations.

FIG. 9C shows a flowchart illustrating an example operation 920 for wireless communication that supports spatial reuse according to some implementations. The operation 920 may be performed by a wireless communication device such as the wireless communication device 500 described above with reference to FIG. 5. In some implementations, the operation 920 may be performed by a wireless communication device operating as or within an AP, such as one of the APs 102 and 602 described above with reference to FIGS. 1 and 6A, respectively. In the example of FIG. 9C, the operation 920 is performed by the first AP associated with the first BSS.

In some implementations, the operation 920 may be an example of determining the second expected received signal strength in block 704 of FIG. 7. In some other implementations, the operation 920 may be an example of determining the second expected received signal strength in block 906 of FIG. 9A. For example, at block 922, the first AP determines an average of the third received signal strengths of the one or more OBSS packets at the first AP. At block 924, the first AP determines the second expected received signal strength based on the average RCPI of the one or more OBSS packets received at the first wireless station plus an instantaneous value of third received signal strengths minus the average of the third received signal strengths.

Figure 10A:
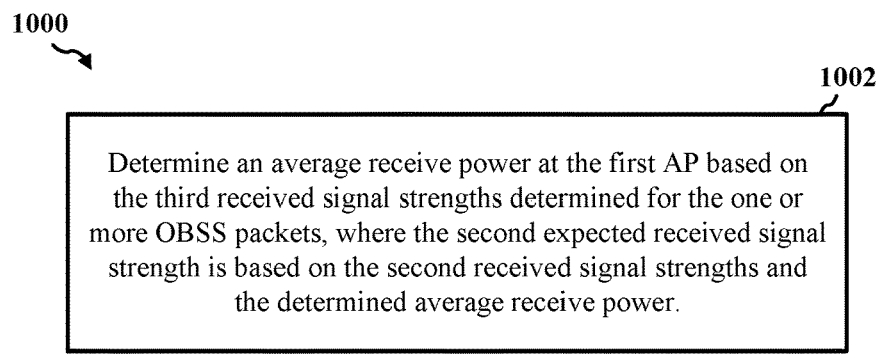
FIG. 10A shows a flowchart illustrating an example operation for wireless communication that supports spatial reuse according to some implementations.

FIG. 10A shows a flowchart illustrating an example operation 1000 for wireless communication that supports spatial reuse according to some implementations. The operation 1000 may be performed by a wireless communication device such as the wireless communication device 500 described above with reference to FIG. 5. In some implementations, the operation 1000 may be performed by a wireless communication device operating as or within an AP, such as one of the APs 102 and 602 described above with reference to FIGS. 1 and 6A, respectively. In the example of FIG. 10A, the operation 1000 is performed by the first AP associated with the first BSS.

In some implementations, the operation 1000 may be another example of determining the second expected received signal strength in block 704 of FIG. 7. In some other implementations, the operation 1000 may be another example of determining the second expected received signal strength in block 906 of FIG. 9A. For example, at block 1002, the first AP determines an average receive power at the first AP based on the third received signal strengths determined for the one or more OBSS packets. In some instances, the second expected received signal strength may be based on the second received signal strengths and the determined average receive power at the first AP.

Figure 10B:
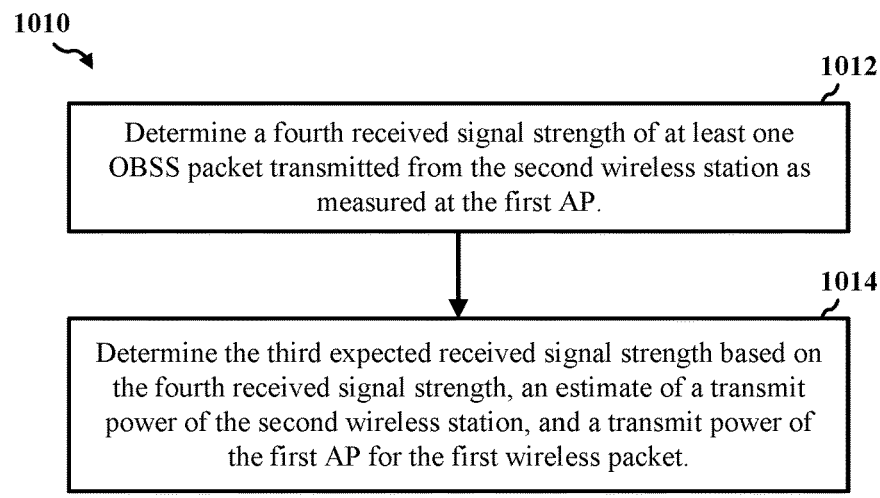
FIG. 10B shows a flowchart illustrating an example operation for wireless communication that supports spatial reuse according to some implementations.

FIG. 10B shows a flowchart illustrating an example operation 1010 for wireless communication that supports spatial reuse according to some implementations. The operation 1010 may be performed by a wireless communication device such as the wireless communication device 500 described above with reference to FIG. 5. In some implementations, the operation 1010 may be performed by a wireless communication device operating as or within an AP, such as one of the APs 102 and 602 described above with reference to FIGS. 1 and 6A, respectively. In the example of FIG. 10B, the operation 1010 is performed by the first AP associated with the first BSS.

In some implementations, the operation 1010 may be an example of determining the third expected received signal strength in block 706 of FIG. 7. For example, at block 1012, the first AP determines a fourth received signal strength of at least one OBSS packet transmitted from the second STA as measured at the first AP. At block 1014, the first AP determines the third expected received signal strength based on the fourth received signal strength, an estimate of a transmit power of the second STA, and a transmit power of the first AP for the first wireless packet.

Figure 10C:
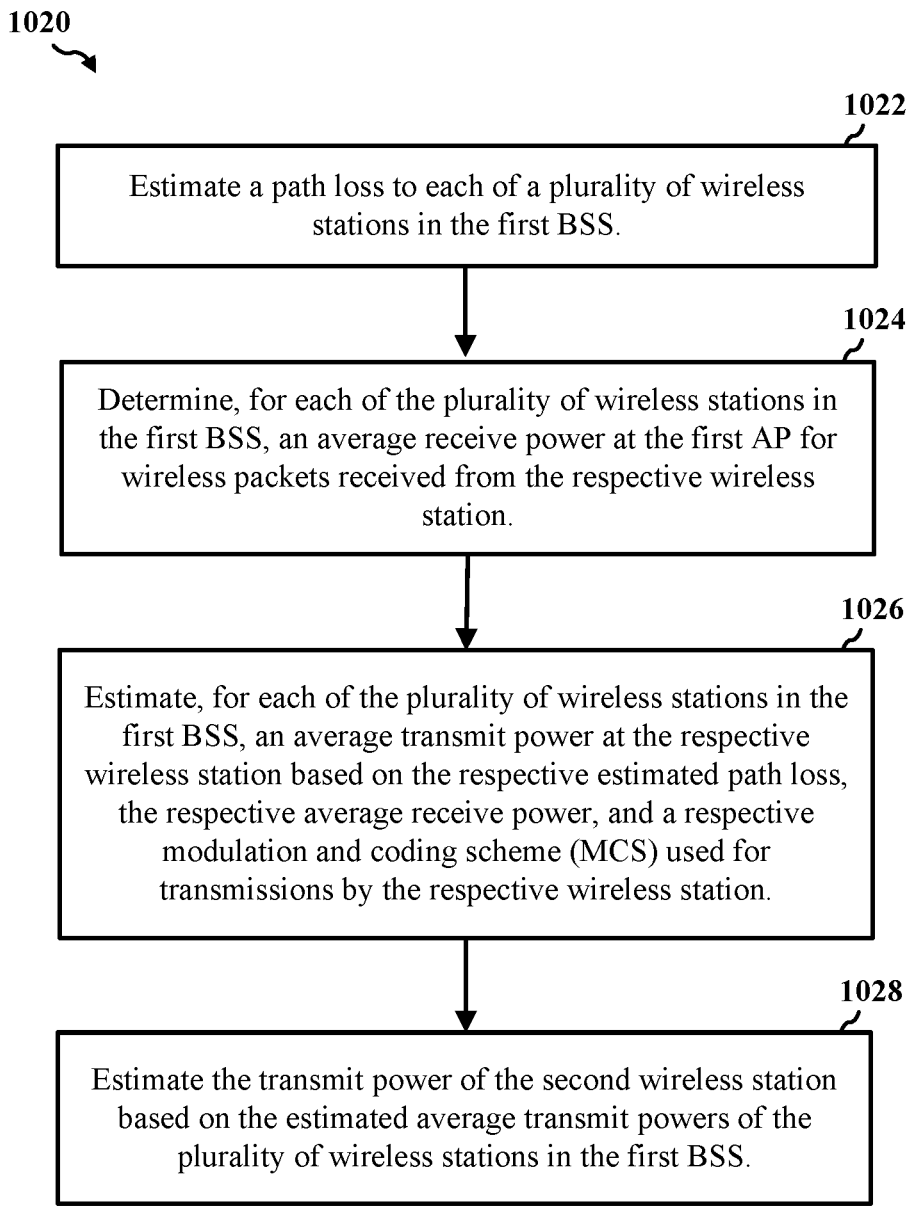
FIG. 10C shows a flowchart illustrating an example operation for wireless communication that supports spatial reuse according to some implementations.

FIG. 10C shows a flowchart illustrating an example operation 1020 for wireless communication that supports spatial reuse according to some implementations. The operation 1020 may be performed by a wireless communication device such as the wireless communication device 500 described above with reference to FIG. 5. In some implementations, the operation 1020 may be performed by a wireless communication device operating as or within an AP, such as one of the APs 102 and 602 described above with reference to FIGS. 1 and 6A, respectively. In the example of FIG. 10C, the operation 1020 is performed by the first AP associated with the first BSS.

In some implementations, the operation 1020 may be an example of estimating the transmit power of the second STA in block 1014 of FIG. 10B. For example, at block 1022, the first AP estimates a path loss to each of a plurality of STAs in the first BSS. In some instances, the plurality of STAs in the first BSS includes the first STA. At block 1024, the first AP determines, for each of the plurality of STAs in the first BSS, an average receive power at the first AP for wireless packets received from the respective STA. At block 1026, the first AP estimates, for each of the plurality of STAs in the first BSS, an average transmit power at the respective STA based on the respective estimated path loss, the respective average receive power, and a respective modulation and coding scheme (MCS) used for transmissions by the respective STA. At block 1028, the first AP estimates the transmit power of the second STA based on the estimated average transmit powers of the plurality of STAs in the first BSS. In some implementations, the first AP may estimate the transmit power of the second STA by determining, as the estimate of the transmit power of the second STA, a lowest one of the estimated average transmit powers.

Figure 11:
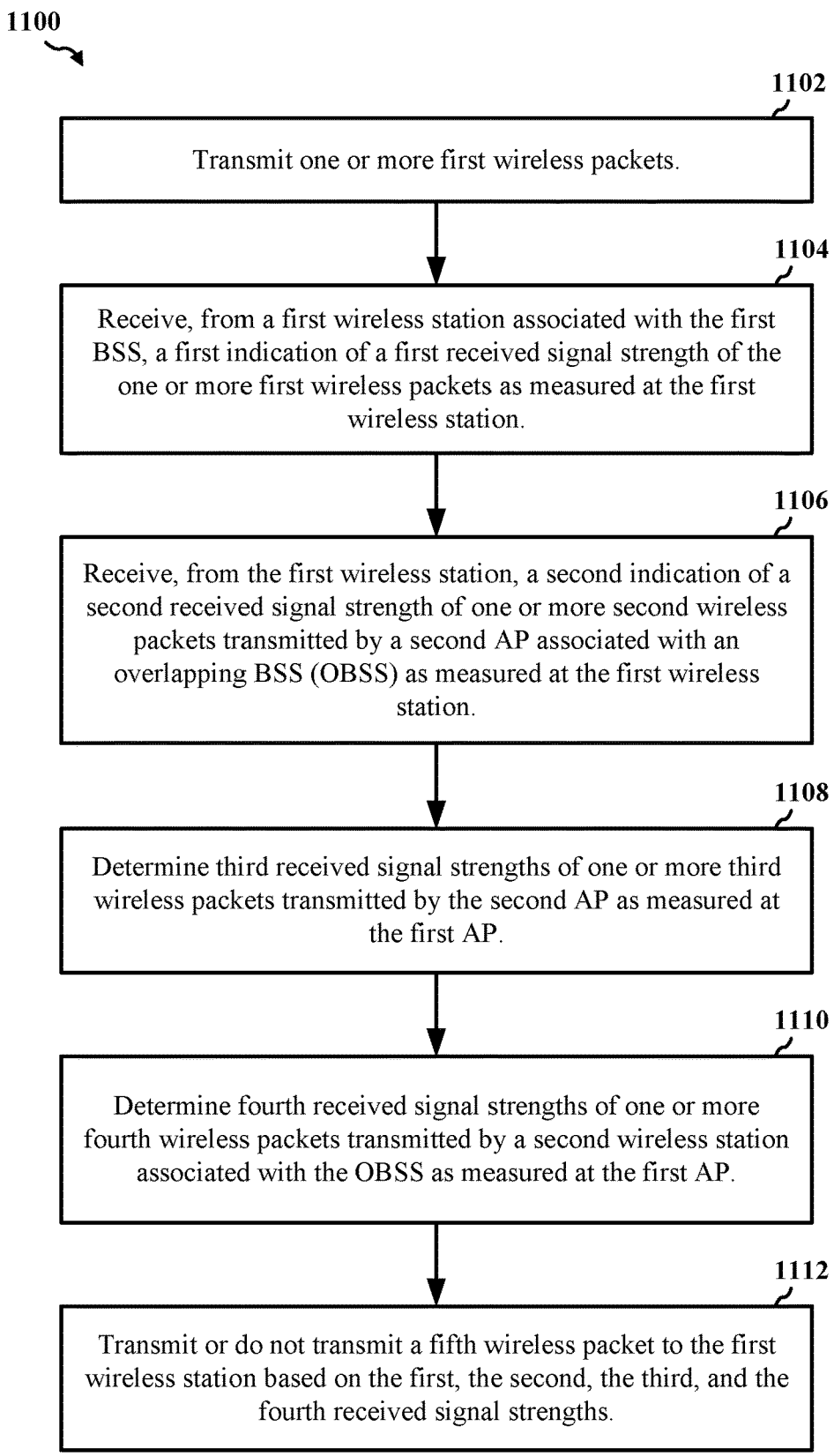
FIG. 11 shows a flowchart illustrating an example operation for wireless communication that supports spatial reuse according to some other implementations.

FIG. 11 shows a flowchart illustrating an example operation 1100 for wireless communication that supports spatial reuse according to some other implementations. The operation 1100 may be performed by a wireless communication device operating as or within an AP, such as one of the APs 102 and 602 described above with reference to FIGS. 1 and 6A, respectively. In the example of FIG. 11, the operation 1100 is performed by the first AP associated with the first BSS.

At block 1102, the first AP transmits one or more first wireless packets. At block 1104, the first AP receives, from a first STA associated with the first BSS, a first indication of a first received signal strength of the one or more first wireless packets as measured at the first STA. At block 1106, the first AP receives, from the first STA, a second indication of a second received signal strength of one or more second wireless packets transmitted by a second AP associated with an OBSS as measured at the first STA. At block 1108, the first AP determines third received signal strengths of one or more third wireless packets transmitted by the second AP as measured at the first AP. At block 1110, the first AP determines fourth received signal strengths of one or more fourth wireless packets transmitted by a second STA associated with the OBSS as measured at the first AP. At block 1112, the first AP transmits or does not transmit a fifth wireless packet to the first STA based on the first, the second, the third, and the fourth received signal strengths.

In some implementations, the fifth wireless packet may be an SR packet, and the first AP may transmit the SR packet to the first STA in the presence of an ongoing OBSS transmission only when the received signal strength of the SR packet at the first STA is greater than the OBSS signal degradation at the second STA caused by the SR transmission. That is, the first AP may transmit the SR packet to the first STA when $$\frac{S_{AP1 \to STA1}}{S_{AP2 \to STA1} + N} >= \frac{S_{AP1 \to STA2}}{N},$$

and may not transmit the SR packet to the first STA when $$\frac{S_{AP1 \to STA1}}{S_{AP2 \to STA1} + N} < \frac{S_{AP1 \to STA2}}{N}.$$

Figure 12:
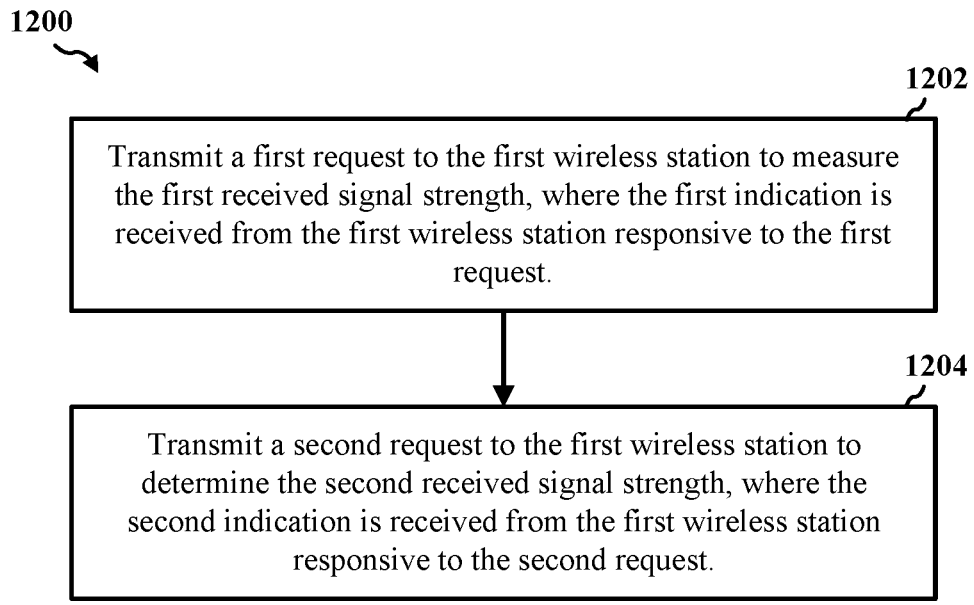
FIG. 12 shows a flowchart illustrating an example operation for wireless communication that supports spatial reuse according to some other implementations.

FIG. 12 shows a flowchart illustrating an example operation 1200 for wireless communication that supports spatial reuse according to some other implementations. The operation 1200 may be performed by a wireless communication device such as the wireless communication device 500 described above with reference to FIG. 5. In some implementations, the operation 1200 may be performed by a wireless communication device operating as or within an AP, such as one of the APs 102 and 602 described above with reference to FIGS. 1 and 6A, respectively. In the example of FIG. 12, the operation 1200 is performed by the first AP associated with the first BSS.

In some instances, the operation 1200 may be performed in conjunction with receiving the first and second indications in respective blocks 1104 and 1106 of FIG. 11. For example, at block 1202, the first AP transmits a first request to the first wireless station to measure the first received signal strength, wherein the first indication is received responsive to the first request. At block 1204, the first AP transmits a second request to the first wireless station to measure the second received signal strength, wherein the second indication is received responsive to the second request.

In some implementations, the one or more first wireless packets may be beacon frames, and the first AP may transmit a beacon request for the first STA to measure the received signal strength of a beacon frame. The first STA may measure the received signal strength of the beacon frame, and report the measured signal strength of the beacon frame to the first AP in a beacon report. In some implementations, the one or more second wireless packets may be OBSS packets, and the first AP may transmit a frame request for the first STA to measure the RCPI value of each packet received or detected by the first STA. The first STA may measure the RCPI values of the received OBSS packets, and may report the measured RCPI values to the first AP in a frame report. In some instances, the first STA may report the average RCPI value of the received OBSS packets to the first AP in the frame report.

Figure 13:
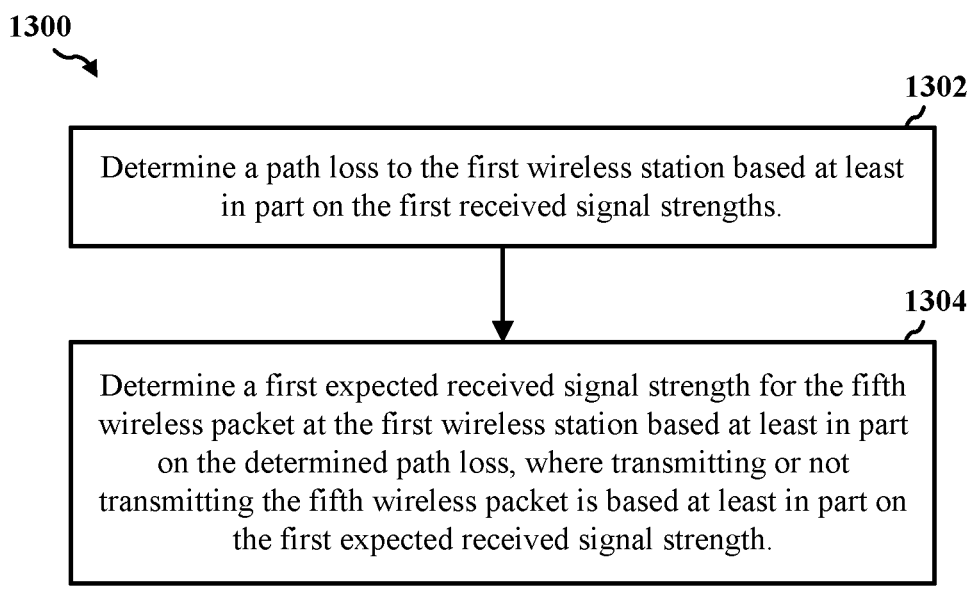
FIG. 13 shows a flowchart illustrating an example operation for wireless communication that supports spatial reuse according to some other implementations.

FIG. 13 shows a flowchart illustrating an example operation 1300 for wireless communication that supports spatial reuse according to some other implementations. The operation 1300 may be performed by a wireless communication device operating as or within an AP, such as one of the APs 102 and 602 described above with reference to FIGS. 1 and 6A, respectively. In the example of FIG. 13, the operation 1300 is performed by the first AP associated with the first BSS.

In some instances, the operation 1300 may be performed after receiving the first indication from the first STA in block 1104 of FIG. 11. For example, at block 1302, the first AP determines a path loss to the first STA based at least in part on the first received signal strengths. At block 1304, the first AP determines a first expected received signal strength for the fifth wireless packet at the first STA based at least in part on the determined path loss. In some instances, transmitting or not transmitting the fifth wireless packet to the first STA may be based at least in part on the first expected received signal strength.

Figure 14A:
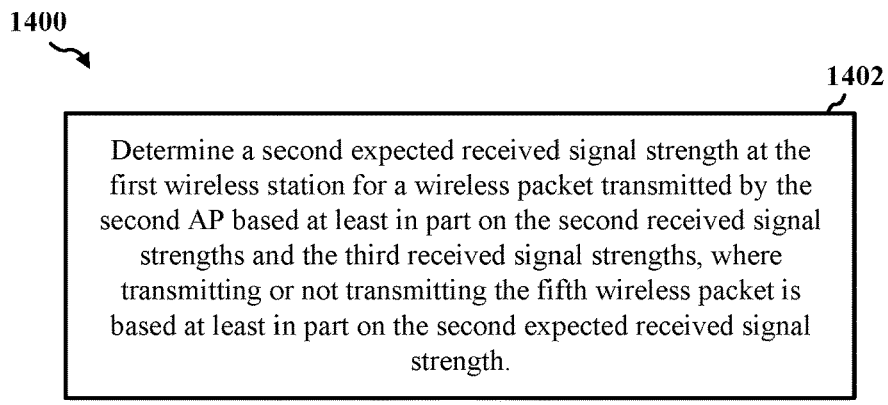
FIG. 14A shows a flowchart illustrating an example operation for wireless communication that supports spatial reuse according to some other implementations.

FIG. 14A shows a flowchart illustrating an example operation 1400 for wireless communication that supports spatial reuse according to some other implementations. The operation 1400 may be performed by a wireless communication device such as the wireless communication device 500 described above with reference to FIG. 5. In some implementations, the operation 1400 may be performed by a wireless communication device operating as or within an AP, such as one of the APs 102 and 602 described above with reference to FIGS. 1 and 6A, respectively. In the example of FIG. 14A, the operation 1400 is performed by the first AP associated with the first BSS.

In some instances, the operation 1400 may be performed in conjunction with transmitting or not transmitting the fifth wireless packet in block 1112 of FIG. 11. For example, at block 1402, the first AP determines a second expected received signal strength at the first STA for a wireless packet transmitted by the second AP based at least in part on the second received signal strengths and the third received signal strengths. In some instances, transmitting or not transmitting the fifth wireless packet to the first STA may be based at least in part on the second expected received signal strength. In some implementations, the wireless packet may be part of an OBSS transmission from the second AP, the second received signal strengths may be an average RCPI value of one or more OBSS packets transmitted from the second AP and received by the first STA, and the third received signal strengths may be received signal strengths or RCPI values of the one or more OBSS packets transmitted from the second AP and received by the first AP.

Figure 14B:
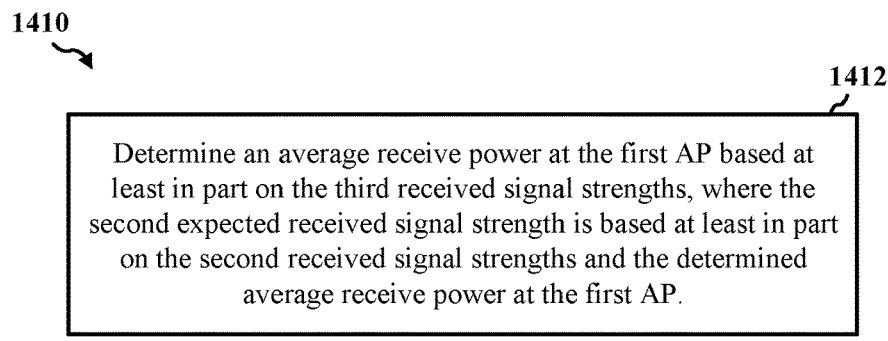
FIG. 14B shows a flowchart illustrating an example operation for wireless communication that supports spatial reuse according to some other implementations.

FIG. 14B shows a flowchart illustrating an example operation 1410 for wireless communication that supports spatial reuse according to some other implementations. The operation 1410 may be performed by a wireless communication device such as the wireless communication device 500 described above with reference to FIG. 5. In some implementations, the operation 1410 may be performed by a wireless communication device operating as or within an AP, such as one of the APs 102 and 602 described above with reference to FIGS. 1 and 6A, respectively. In the example of FIG. 14B, the operation 1410 is performed by the first AP associated with the first BSS.

In some instances, the operation 1410 may be an example of determining the second expected received signal strength in block 1402 of FIG. 14A. For example, at block 1412, the first AP determines an average receive power at the first AP based at least in part on the third received signal strengths. In some implementations, the second expected received signal strength may be based at least in part on the second received signal strengths and the determined average receive power at the first AP.

Figure 15:
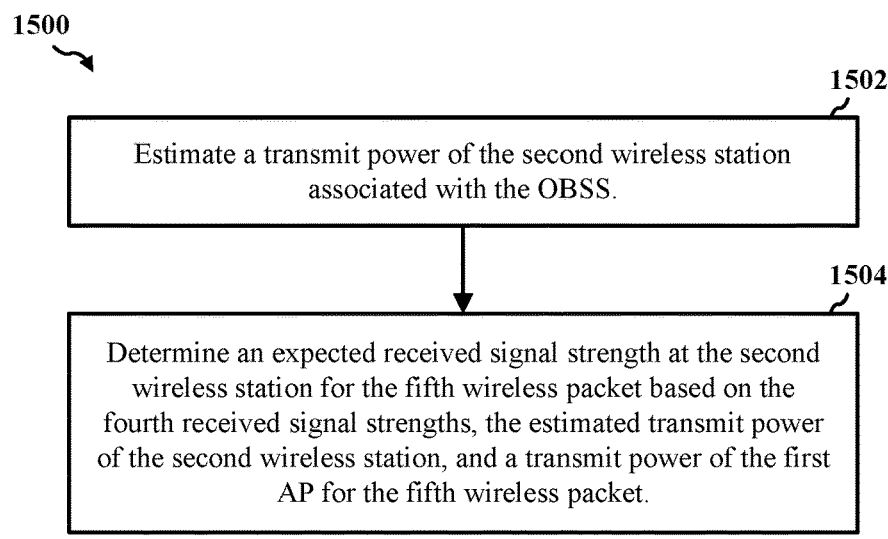
FIG. 15 shows a flowchart illustrating an example operation for wireless communication that supports spatial reuse according to some other implementations.

FIG. 15 shows a flowchart illustrating an example operation 1500 for wireless communication that supports spatial reuse according to some other implementations. The operation 1500 may be performed by a wireless communication device such as the wireless communication device 500 described above with reference to FIG. 5. In some implementations, the operation 1500 may be performed by a wireless communication device operating as or within an AP, such as one of the APs 102 and 602 described above with reference to FIGS. 1 and 6A, respectively. In the example of FIG. 15, the operation 1500 is performed by the first AP associated with the first BSS.

In some instances, the operation 1500 may be performed after determining the fourth received signal strengths in block 1110 of FIG. 11. For example, at block 1502, the first AP estimates a transmit power of the second STA associated with the OBSS. At block 1504, the first AP determines an expected received signal strength at the second STA for the fifth wireless packet based on the fourth received signal strengths, the estimated transmit power of the second STA, and a transmit power of the first AP for the fifth wireless packet. In some instances, transmitting or not transmitting the fifth wireless packet to the first STA may be based at least in part on the expected received signal strength at the second STA for the fifth wireless packet.

Figure 16:
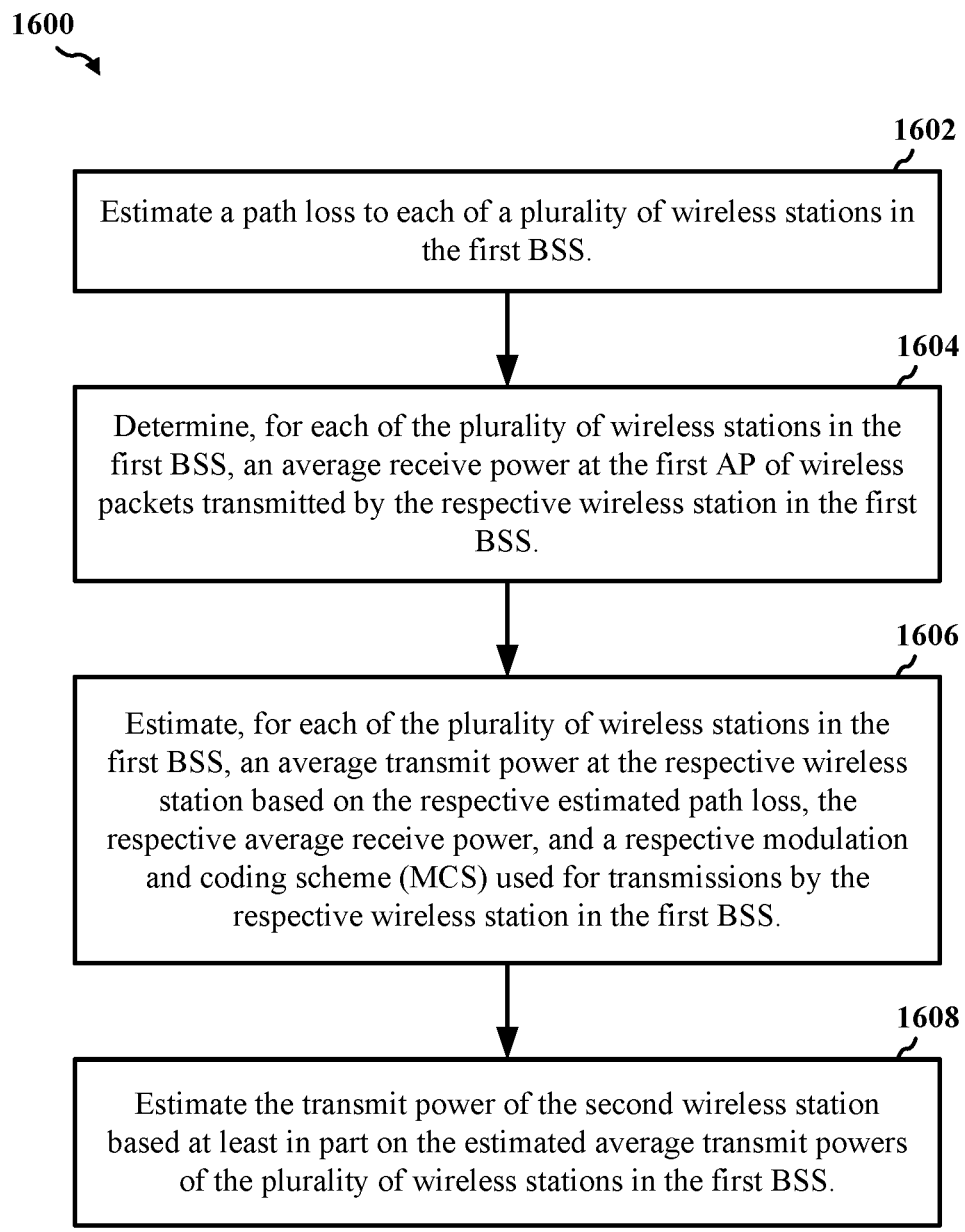
FIG. 16 shows a flowchart illustrating an example operation for wireless communication that supports spatial reuse according to some other implementations.

FIG. 16 shows a flowchart illustrating an example operation 1600 for wireless communication that supports spatial reuse according to some other implementations. The operation 1600 may be performed by a wireless communication device such as the wireless communication device 500 described above with reference to FIG. 5. In some implementations, the operation 1600 may be performed by a wireless communication device operating as or within an AP, such as one of the APs 102 and 602 described above with reference to FIGS. 1 and 6A, respectively. In the example of FIG. 16, the operation 1600 is performed by the first AP associated with the first BSS.

In some instances, the operation 1600 may be an example of estimating the transmit power of the second STA in block 1502 of FIG. 15. For example, at block 1602, the first AP estimates a path loss to each of a plurality of STAs in the first BSS. At block 1604, the first AP determines, for each of the plurality of STAs in the first BSS, an average receive power at the first AP of wireless packets transmitted by the respective STA in the first BSS. At block 1606, the first AP estimates, for each of the plurality of STAs in the first BSS, an average transmit power at the respective STA based on the respective estimated path loss, the respective average receive power, and a respective MCS used for transmissions by the respective STA in the first BSS. At block 1608, the first AP estimates the transmit power of the second STA based at least in part on the estimated average transmit powers of the plurality of STAs in the first BSS.

In some implementations, the first AP may use measurement frames such as beacon requests and beacon reports to solicit received signal strength measurements of one or more beacon frames from each of the plurality of STAs in the first BSS, and may estimate the path loss between the first AP and each of the plurality of STAs in the first BSS based on differences between the transmit power used by the first AP and the determined path loss from the first AP to a respective STA of the plurality of STAs in the first BSS. In some implementations, the first AP may estimate the average transmit power used by each of the plurality of STAs in the first BSS based on a sum of the received signal strengths measured by the first AP and the determined path loss from the first AP to a respective STA of the plurality of STAs in the first BSS. The second STA associated with the OBSS is likely to use a transmit power level similar to the transmit power levels used by the plurality of STAs associated with the first BSS, the first AP can use the average determined transmit power for the plurality of STAs associated with the first BSS as an approximation of the transmit power of the second STA. In some instances, the first AP can express the transmit power of the second STA as a function of the data rate or MCS used by the second STA, and then select the minimum of the average transmit powers of the plurality of STAs associated with the first BSS as the approximation of the transmit power of the second STA.

Figure 17:
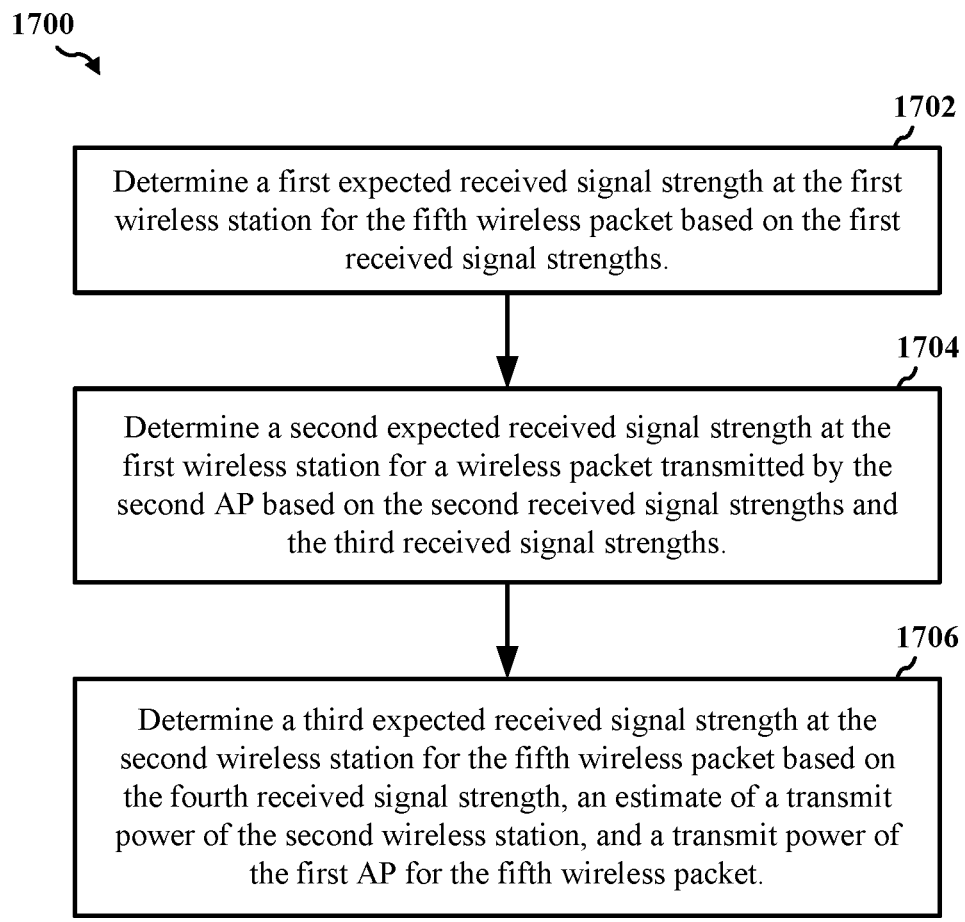
FIG. 17 shows a flowchart illustrating an example operation for wireless communication that supports spatial reuse according to some other implementations.

FIG. 17 shows a flowchart illustrating an example operation 1700 for wireless communication that supports spatial reuse according to some other implementations. The operation 1700 may be performed by a wireless communication device such as the wireless communication device 500 described above with reference to FIG. 5. In some implementations, the operation 1700 may be performed by a wireless communication device operating as or within an AP, such as one of the APs 102 and 602 described above with reference to FIGS. 1 and 6A, respectively. In the example of FIG. 17, the operation 1700 is performed by the first AP associated with the first BSS.

In some instances, the operation 1700 may be performed in conjunction with one or more of the operations performed in FIG. 11. For example, at block 1702, the first AP determines a first expected received signal strength at the first STA for the fifth wireless packet based on the first received signal strengths. At block 1704, the first AP determines a second expected received signal strength at the first STA for a wireless packet transmitted by the second AP based on the second received signal strengths and the third received signal strengths. At block 1706, the first AP determines a third expected received signal strength at the second STA for the fifth wireless packet based on the fourth received signal strength, an estimate of a transmit power of the second STA, and a transmit power of the first AP for the fifth wireless packet. In some instances, the first AP may determine whether to transmit or not transmit the fifth wireless packet based at least in part on the first, the second, and the third expected received signal strengths.

Figure 18:
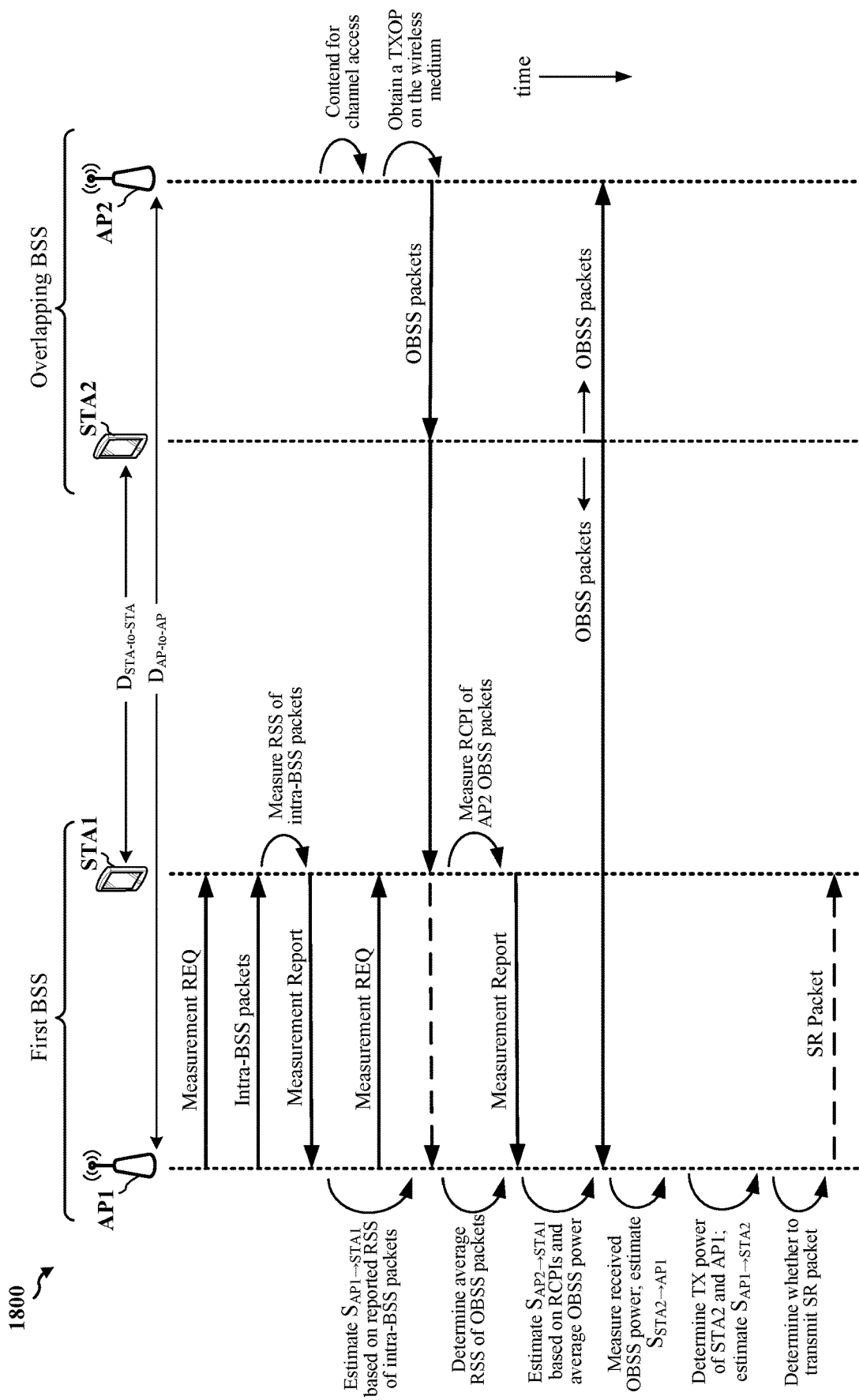
FIG. 18 shows a timing diagram illustrating the transmissions of communications that supports spatial reuse according to some implementations.

FIG. 18 shows a timing diagram 1800 illustrating the transmission of communications that support spatial reuse according to some implementations. The communications may relate to spatial reuse (SR) transmissions by wireless communication devices associated with or belonging to a first BSS in the presence of interference associated with an overlapping BSS (OBSS) transmission. The first BSS may include a first wireless access point (AP1) and one or more first wireless stations (STA1), and the OBSS may include a second wireless access point (AP2) and one or more second wireless stations (STA2). In some instances, the wireless access points AP1 and AP2 may be examples of one of the APs 102 and 602 described above with reference to FIGS. 1 and 6A, respectively, and the wireless stations STA1 and STA2 may be examples of one of the STAs 104 and 604 described above with reference to FIGS. 1 and 6B, respectively. Although the first BSS is shown in the example of FIG. 18 as including one access point (AP1) and one wireless station (STA1), in some other implementations, the first BSS may include any suitable number of access points and any suitable number of wireless stations. Similarly, although the OBSS is shown in the example of FIG. 18 as including one access point (AP2) and one wireless station (STA2), in some other implementations, the OBSS may include any suitable number of access points and any suitable number of wireless stations.

The first BSS and the OBSS may be sufficiently proximate to one another such that the transmission of intra-BSS packets between AP1 and its associated wireless stations STA1 in the first BSS may interfere with the transmission of packets between AP2 and its associated wireless stations STA2 in the OBSS, and the transmission of packets between AP2 and its associated wireless stations STA2 may interfere with the transmission of intra-BSS packets between AP1 and its associated wireless stations STA1. In some implementations, STA1 may be closer to STA2 than AP1 is to AP2. In some instances, a distance $D_{STA\text{-}to\text{-}STA}$ between STA1 and STA2 is less than a distance DAP-to-AP between AP1 and AP2 by at least an amount that results in the level of OBSS interference detected at STA1 being greater than the level of OBSS interference detected at AP1. In some other instances, a difference between the level of OBSS interference detected at STA1 and the level of OBSS interference detected at AP1 is at least an amount that may result in the level of OBSS interference detected at STA1 being greater than a threshold and the level of OBSS interference detected at AP1 being less than the threshold.

In some implementations, AP1 transmits a first measurement request frame that solicits STA1 to measure and report signal strength measurements of one or more intra-BSS packets to be transmitted from AP1 and received by STA1. Next, AP1 transmits the one or more intra-BSS packets to STA1 over a wireless medium associated with the first BSS. STA1 receives the one or more intra-BSS packets, measures the received signal strength of the one or more intra-BSS packets, and reports the measured received signal strengths to AP1 in one or more first measurement report frames. The one or more intra-BSS packets may be any suitable packet or frame from which STA1 can determine a received signal strength. In some instances, the one or more intra-BSS packets may be beacon frames transmitted by AP1, the first measurement request frame may carry one or more beacon requests for STA1 to measure the received signal strengths of one or more corresponding beacon frames, and the first measurement report frame may carry one or more beacon reports containing the measured received signal strengths of the respective one or more beacon frames.

AP1 receives the first measurement report frame from STA1, and determines an expected received signal strength at STA1 for an SR packet to be transmitted from AP1 based on the signal strengths of the intra-BSS packets as measured by STA1. In some instances, the expected received signal strength determined by AP1 corresponds to the value $S_{AP1 \to STA1}$. In some other instances, AP1 may use the received signal strength measurements reported by STA1 to estimate a path loss from AP1 to STA1, and may then estimate the expected received signal strength of the SR packet at STA1 based on a transmit power of AP1 and the determined path loss to STA1.

In some implementations, AP1 transmits a second measurement request frame that solicits STA1 to measure and report an RCPI value for each wireless packet received by STA1. In some instances, STA1 receives one or more OBSS packets transmitted from AP2, measures RCPI values of the one or more OBSS packets, and reports the measured RCPI values of the OBSS packets to AP1 in one or more second measurement report frames. In some instances, the second measurement request frame may carry one or more frame request elements for STA1 to measure the RCPI value of each wireless packet received by STA1, and the second measurement report frame may carry one or more frame report elements containing the measured RCPI values of the OBSS packets.

In some implementations, AP2 contends for channel access to the wireless medium, obtains a TXOP on the wireless medium, and transmits or broadcasts one or more OBSS packets to STA2 over the wireless medium. As discussed, the first BSS and the OBSS are sufficiently proximate to one another and operate on the same or sufficiently similar frequency bands such that wireless packets transmitted between devices associated with the OBSS may be received (or at least detected) by one or more devices associated with the first BSS, and wireless packets transmitted between devices associated with the first BSS may be received (or at least detected) by one or more devices associated with the OBSS. As such, in some instances, both STA2 and STA1 receive the OBSS packets transmitted by AP2.

Responsive to the second measurement request frame, STA1 measures the RCPI value of each of the OBSS packets, and sends the measured RCPI values to AP1 in one or more measurement report frames. In some implementations, the second measurement report frame carries one or more frame reports that contain or indicate the RCPI values of the OBSS packets as measured by STA1. In some instances, STA1 may provide the average RCPI value of the OBSS packets and the RCPI value of a last-received OBSS packet in the frame response.

AP1 receives the RCPI values measured by STA1, and determines the received signal strength of the OBSS packets transmitted by AP2 and received at STA1. AP1 also receives the one or more OBSS packets transmitted by AP2, and determines an average received signal strength of the OBSS packets transmitted by AP2 and received by AP1. The determined average received signal strength may be indicative of an average power level of OBSS interference received at AP1. In some implementations, AP1 may determine the value of $S_{AP2 \to STA1}$ based on the reported RCPI values of the OBSS packets and the average receive power of the OBSS packets at AP1. In some other implementations, AP1 may determine the value for $S_{AP2 \to STA1}$ based on a sum of the average power of the OBSS packets received by STA1 and the instantaneous power level of the OBSS packets received by AP1 minus the average power level of the OBSS packets received by AP1. In some instances, the difference between the instantaneous power level of the OBSS packets received by AP1 and the average power level of the OBSS packets received by AP1 may be used as a correction factor to compensate for different transmit power levels used by the second AP to transmit different OBSS packets.

STA2 transmits OBSS packets to AP2 over the wireless medium, and AP2 receives the OBSS packets. AP1 also receives the OBSS packets transmitted by STA2, and measures the received signal strength of the OBSS packets from STA2. In some instances, the received signal strength of the OBSS packets from STA2 may be used to estimate a value for $S_{STA2 \to AP1}$. AP1 may determine its transmit power $T_{AP1}$, and may estimate STA2's transmit power $T_{STA2}$ based at least in part on STA1's transmit power $T_{STA1}$. AP1 may then estimate the value of $S_{AP1 \to STA2}$ based on the expression $S_{AP1 \to STA2} = T_{AP1} + S_{STA2 \to AP1} - T_{STA2}$, as discussed above. In some instances, the difference between the received signal strength of the OBSS packets at AP1 and the transmit power of STA2, denoted as $S_{STA2 \to AP1} - T_{STA2}$, may be indicative of the path loss from STA2 to AP1.

In some implementations, AP1 uses the noise floor (N) of the wireless medium to determine a first ratio ($R_1$) of the expected received signal strength of the SR packet at STA1 to a sum of the expected received signal strength of OBSS packets at STA1 and the noise floor. AP1 also uses the noise floor to determine a second ratio ($R_2$) of the expected received signal strength of the SR packet at STA2 to the noise floor. As discussed, the first ratio $R_1$ may be expressed as $$R_1 = \frac{S_{AP1 \to STA1}}{S_{AP2 \to STA1} + N},$$

and the second ratio $R_2$ may be expressed as $$R_2 = \frac{S_{AP1 \to STA2}}{N}.$$

In some implementations, AP1 determines whether to transmit SR packets to STA1 in the presence of OBSS transmissions based on the determined value of the first ratio $R_1$ relative to the determined value of the second ratio $R_2$. In some instances, AP1 may transmit the SR packets to STA1 in the presence of OBSS transmissions or interference when $$\frac{S_{AP1 \to STA1}}{S_{AP2 \to STA1} + N} \geq \frac{S_{AP1 \to STA2}}{N},$$

and may not transmit SR packets to STA1 in the presence of OBSS transmissions or interference when $$\frac{S_{AP1 \to STA1}}{S_{AP2 \to STA1} + N} < \frac{S_{AP1 \to STA2}}{N}.$$

In other words, AP1 may use SR transmissions to STA1 in the presence of OBSS transmissions or interference when the signal strength of SR packets received at STA1 would be greater than an amount of signal degradation of the OBSS packets caused by the SR transmission, and may not use SR transmissions to STA1 in the presence of OBSS transmissions or interference when the signal strength of the SR packets received at STA1 would be less than the amount of signal degradation of the OBSS packets caused by the SR transmission. In this way, implementations of the subject matter disclosed herein may ensure that the overall gain or throughput on the wireless medium is increased (or at least maintained at a certain level or within a certain range) when AP1 transmits SR packets to STA1 in the presence of an ongoing OBSS transmission between AP2 and STA2.

Figure 19A:
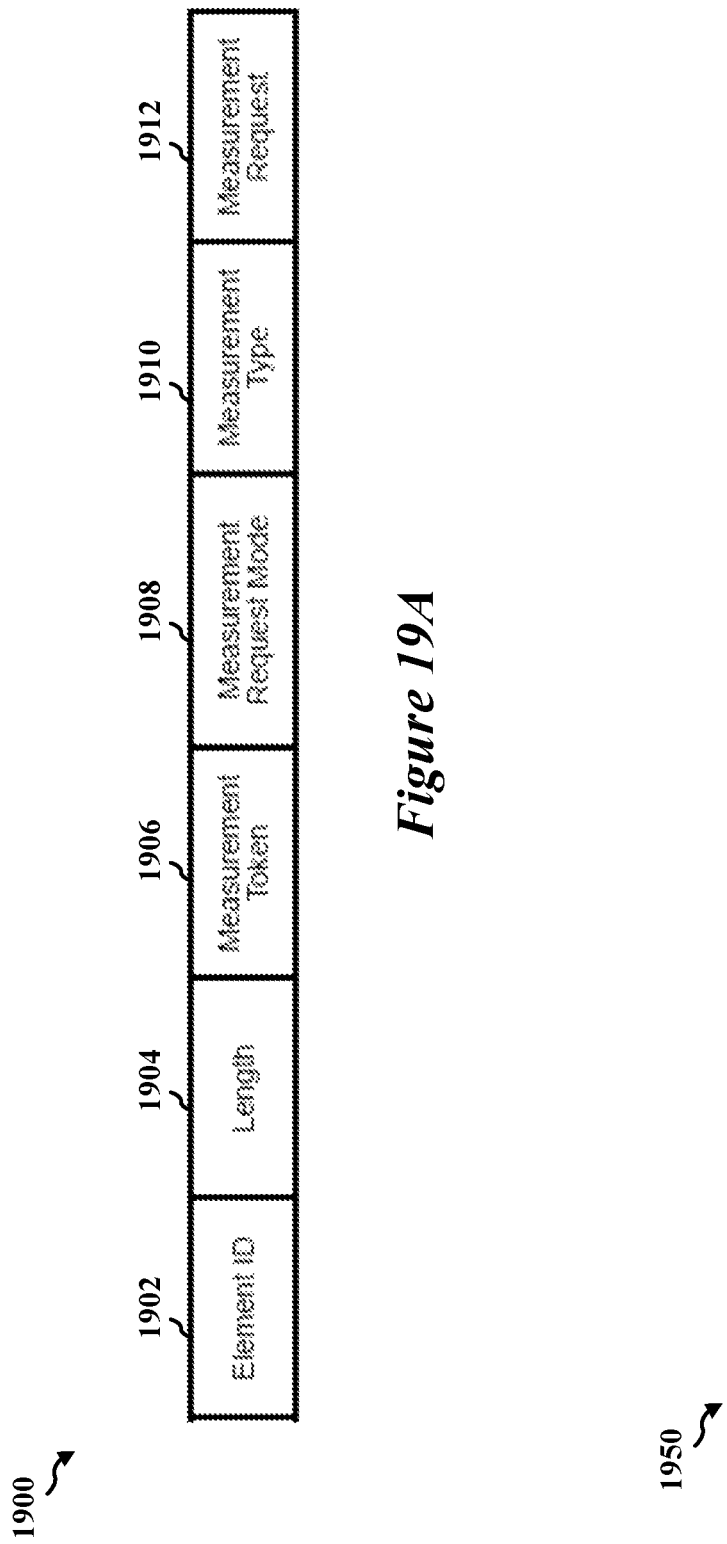
FIG. 19A shows an example Measurement Request Element usable for wireless communications that support spatial reuse according to some implementations.

FIG. 19A shows an example Measurement Request Element 1900 usable for wireless communications according to some implementations. In some instances, the Measurement Request Element 1900 may request a receiving device to make iterative measurements for all primary channel positions for a corresponding AP. The Measurement Request Element 1900 may include an Element ID field 1902, a Length field 1904, a Measurement Token field 1906, a Measurement Request Mode field 1908, a Measurement Type field 1910, and a Measurement Request field 1912. In some instances, the Element ID field 1902 may be 1 octet long and may include an identifier for the Measurement Request Element 1900. The Length field 1904 may be 1 octet long, and may indicate a length of the Measurement Request Element 1900. The Measurement Token field 1906 carries a nonzero number that is unique among the Measurement Request Elements in a particular Measurement Request frame. The Measurement Request Mode field 1908 is a bit field that includes a parallel bit indicating whether more than one measurement is to be started in parallel, includes an enable bit that differentiates between a request to make a measurement and a request to control the measurement requests, and includes a duration mandatory bit indicating whether the measurement duration contained within the measurement request is mandatory. The Measurement Type field 1910 carries a value indicative of the type of measurement to be performed (such as passive mode, active mode, or beacon table mode). The Measurement Request field 1912 carries the specification of a single measurement request corresponding to the measurement type.

Figure 19B:
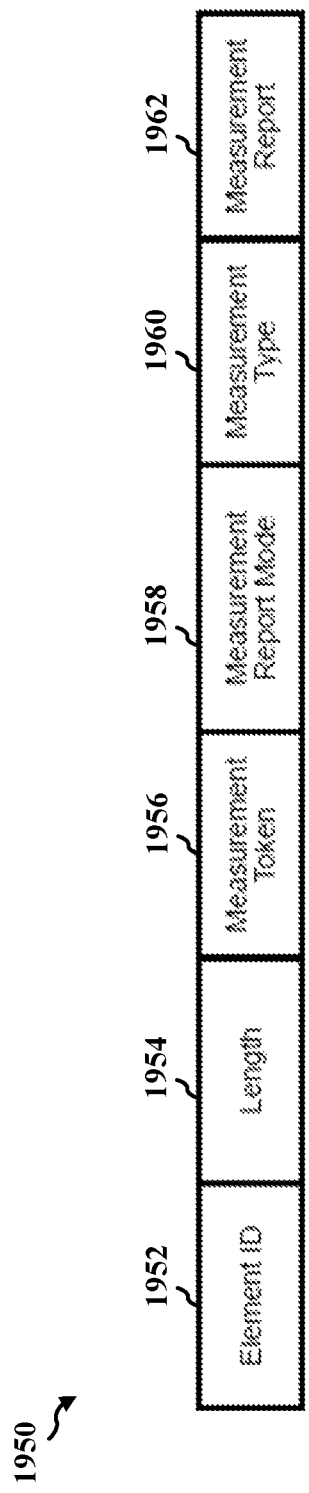
FIG. 19B shows an example Measurement Report Element usable for wireless communications that support spatial reuse according to some implementations.

FIG. 19B shows an example Measurement Response Element 1950 usable for wireless communications according to some implementations. The Measurement Response Element 1950 may include an Element ID field 1952, a Length field 1954, a Measurement Token field 1956, a Measurement Report Mode field 1958, a Measurement Type field 1960, and a Measurement Report Field 1962. In some instances, the Element ID field 1952 may be 1 octet long and may include an identifier for the Measurement Response Element 1950. The Length field 1954 may be 1 octet long, and may indicate a length of the Measurement Response Element 1950.

In some instances, the Measurement Token field 1956 is set to the value of the Measurement Token field 1906 in the corresponding Measurement Request Element 1900. The Measurement Report Mode field 1958 is used to indicate the reason for a failed or rejected measurement request. The Measurement Type field 1960 carries a value that identifies the measurement report carried in or otherwise associated with the Measurement Report field 1962. In some instances, the Measurement Report field 1962 contains a single measurement report. In some other instances, the Measurement Report field 1962 contains a multiple measurement reports.

Figures 20A, 20B:
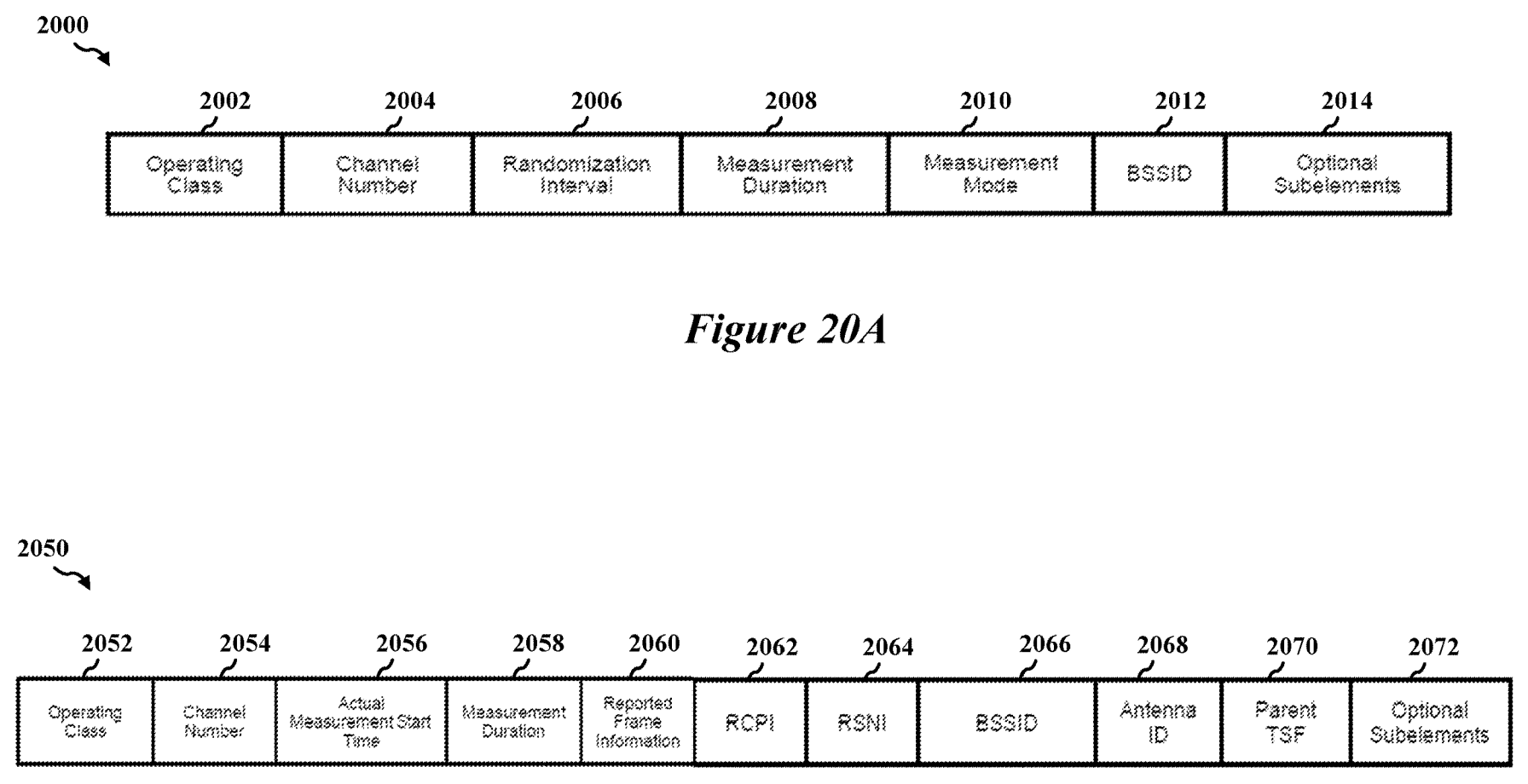

FIG. 20A shows an example Beacon Request 2000 usable for wireless communications according to some implementations. The Beacon Request 2000 may be carried in the Measurement Request Element 1900 of FIG. 19A, and includes an Operating Class field 2002, a Channel Number field 2004, a Randomization Interval field 2006, a Measurement Duration field 2008, a Measurement Mode field 2010, a BSSID field 2012, and an optional Subelements field 2014. The Operating Class field 2002 indicates the operating class that identifies the channel set for which the measurement request applies. The Channel Number field 2004 may indicate the channel or frequency sub-band for which the measurement request applies. The Randomization Interval field 2006 specifies the upper bound of the random delay to be used prior to making the measurement. The Measurement Duration field 2008 indicates a time period during which measurement operations are performed. In some instances, the Measurement Duration field 2008 may be set to the preferred or mandatory duration of the requested measurement.

The Measurement Mode field 2010 indicates the mode to be used for the measurement (such as passive mode, active mode, or beacon table mode). The BSSID field 2012 indicates the BSSID of the BSS(s) for which one or more beacon reports are requested. As such, in some instances, the BSSID field 2012 includes the BSSID of the BSS. In other instances, the BSSID field 2012 may include the wildcard BSSID when the beacon request 2000 calls for beacon reports for all BSSs on a particular channel. The Optional Subelements field 2014 contains zero or more subelements such as, for example, an SSID subelement, a beacon reporting subelement, a reporting detail subelement, a request, an extended request, an AP channel report, a wide bandwidth channel Switch, or a vendor-specific information element.

FIG. 20B shows an example Beacon Report 2050 usable for wireless communications according to some implementations. The Beacon Report 2050, which may be carried in the Measurement Response Element 1950 of FIG. 19B, includes an Operating Class field 2052, a Channel Number field 2054, an Actual Measurement Start Time field 2056, a Measurement Duration field 2058, a Reported Frame Information field 2060, an RCPI field 2062, an RSNI field 2064, a BSSID field 2066, an Antenna ID field 2068, a Parent TSF field 2070, and an optional Subelements field 2072. The Operating Class field 2052 may indicate the operating class that identifies the channel set for which the measurement request applies. The Channel Number field 2054 indicates the channel or frequency sub-band for which the measurement request applies. The Actual Measurement Start Time field 2056 is set to the value of the measuring STA's TSF timer at the time the measurement started.

The Measurement Duration field 2058 is set to the duration over which the Beacon Report 2050 was measured. The Reported Frame Information field 2060 contains a condensed PHY type subfield and a reported frame type subfield. The condensed PHY type subfield indicates the physical medium type on which the beacon frame, the measurement pilot frame, or the probe response frame was received. The Reported Frame Type subfield indicates the type of frame reported. The RCPI field 2062 indicates the RCPI value of a corresponding beacon frame, measurement pilot frame, or probe response frame. The RSNI field 2064 indicates the received signal-to-noise indication (RSNI) for the corresponding beacon frame, measurement pilot frame, or probe response frame. The BSSID field 2066 contains the BSSID from the corresponding beacon frame, measurement pilot frame, or probe response frame being reported. The Antenna ID field 2068 contains the identifying number for the antenna(s) used for the reported measurements. The Parent TSF field 2070 contains the lower 4 octets of the measuring STA's TSF timer value at the start of the STA's reception of the corresponding beacon frame, measurement pilot frame, or probe response frame. The Optional Subelements field 2072 contains zero or more subelements.

FIG. 21A shows an example Frame Request 2100 usable for wireless communications according to some implementations. The Frame Request 2100 may be carried in the Measurement Request Element 1900 of FIG. 19A, and includes an Operating Class field 2102, a Channel Number field 2104, a Randomization Interval field 2106, a Measurement Duration field 2108, a Frame Request Type field 2110, a MAC Address field 2112, and an optional Subelements field 2114. The Operating Class field 2102 may indicate the operating class that identifies the channel set for which the measurement request applies. The Channel Number field 2104 may indicate the channel or frequency sub-band for which the measurement request applies. The Randomization Interval field 2106 specifies the upper bound of the random delay to be used prior to making the measurement. The Measurement Duration field 2108 indicates a time period during which measurement operations are performed. In some instances, the Measurement Duration field 2108 may be set to the preferred or mandatory duration of the requested measurement. The Frame Request Type field 2110 indicates the type of frame requested for the measurement. A value of 0 indicates a beacon frame or a probe response frame, and a value of 1 indicates a measurement pilot frame. The MAC Address field 2112 may contain either a broadcast address or a transmitter address. The optional Subelements field 2114 contains zero or more subelements.

FIG. 21B shows an example Frame Report Element 2150 usable for wireless communications according to some implementations. The Frame Report Element 2150 may be carried in the Measurement Response Element 1950 of FIG. 19B, and includes an Operating Class field 2152, a Channel Number field 2154, an Actual Measurement Start Time field 2156, a Measurement Duration field 2158, and an optional Subelements field 2160. The Operating Class field 2152 indicates the operating class that identifies the channel set of the received beacon frame or probe response frame. The Channel Number field 2154 indicates the channel number of the received beacon frame or probe response frame. In some aspects, the channel number may be defined within an operating class. The Actual Measurement Start Time field 2156 may be set to the value of the measuring STA's TSF timer at the time the measurement started. The Measurement Duration field 2158 may be set to the duration over which the frame report 2150 was measured. The Optional Subelements field 2160 contains zero or more subelements.

Figure 22:
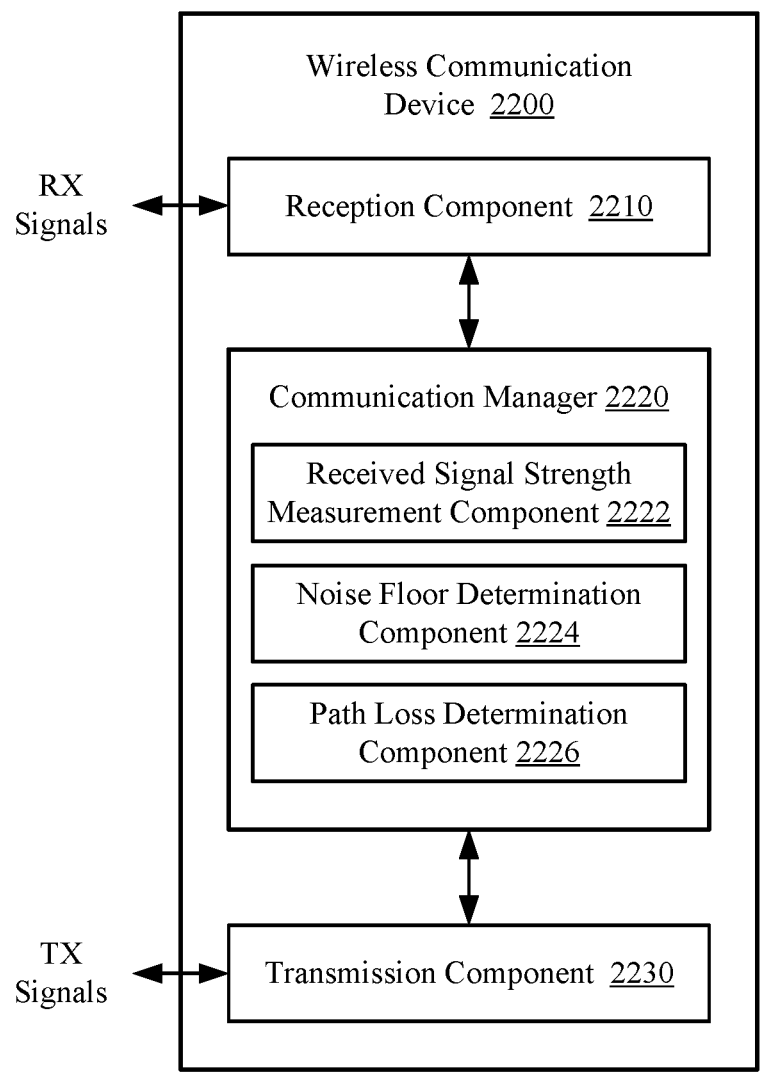
FIG. 22 shows a block diagram of an example wireless communication device according to some implementations.

FIG. 22 shows a block diagram of an example wireless communication device 2200 according to some implementations. In some implementations, the wireless communication device 2200 is configured to perform any of the operations described above with reference to FIGS. 7, 8A-8D, 9A-9C, 10A-10C, 11, 12, 13, 14A-14B, 15, 16, and 17. In some implementations, the wireless communication device 2200 can be an example implementation of the wireless communication device 500 described above with reference to FIG. 5. For example, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 may further include a received signal strength measurement component 2222, a noise floor determination component 2224, and a path loss determination component 2226. Portions of one or more of the components 2222, 2224, and 2226 may be implemented at least in part in hardware or firmware. In some implementations, at least one of the components 2222, 2224, and 2226 is implemented at least in part as software stored in a memory (such as the memory 508). For example, portions of one or more of the components 2222, 2224, and 2226 can be implemented as non-transitory instructions or code executable by a processor (such as the processor 506) to perform the functions or operations of the respective component.

The reception component 2210 is configured to receive RX signals from one or more other wireless communication devices. In some implementations, the RX signals may include OBSS packets, intra-BSS packets, measurement report elements, beacon reports, frame reports, and various other wireless communication signals. The communication manager 2220 is configured to determine whether the wireless communication device 2200 is to employ SR transmissions in the presence of an ongoing OBSS transmission or is to refrain from employing SR transmissions in the presence of the ongoing OBSS transmissions. In some implementations, the received signal strength measurement component 2222 measures the received signal strength of one or more OBSS packets, one or more intra-BSS packets, or other suitable packets, frames, or signals from which a received signal strength, a received channel power indicator, or other indicia of a power level can be determined. The noise floor determination component 2224 determines a value of the noise floor of a wireless medium. The path loss determination component 2226 determines the path loss associated with the transmission of signals, frames, or packets from the wireless communication device 2200 to each of one or more other wireless communication devices. The transmission component 2230 is configured to transmit TX signals to one or more other wireless communication devices. In some implementations, the TX signals may include intra-BSS packets, beacon frames, measurement request elements, beacon requests, frame requests, and various other wireless communication signals.

The example implementations disclosed herein recognize that the expression $SINR_1 > SNR_2 - SIR_2$ can also be represented as $SINR_{AP1 \to STA1} > SNR_{AP1 \to STA2}$, where $SINR_{AP1 \to STA1}$ is indicative of the received signal strength of SR packets transmitted by the first AP as measured at the first STA, and $SNR_{AP1 \to STA2}$ is indicative of the received signal strength of SR packets transmitted by the first AP as measured at the second STA if the second STA is associated with the first AP (such as rather than being associated with the OBSS). In some implementations, the first AP may include two separate rate adaptation tables for each of its associated STAs. Specifically, the first rate adaptation table may store first MCS values that can be used when there is a presence of OBSS interference on the wireless medium (such as when the first AP allows other APs to use SR transmissions), and the second rate adaptation table may store second MCS values that can be used when there is an absence of OBSS interference on the wireless medium (such as when the first AP does not allow other APs to use SR transmissions). In some instances, the value of $SINR_{AP1 \to STA1}$ may be estimated based on the MCS value that was used for transmitting SR packets from the first AP to the first STA, and the value of $SNR_{AP1 \to STA2}$ may be estimated based on the MCS value that the first AP would have used to transmit the SR packets to the first STA in the absence of OBSS interference on the wireless medium. For example, the MCS value that was used for SR transmissions may be obtained from the first rate adaptation table, and the MCS value that would have been used for the SR transmissions in the absence of OBSS interference may be obtained from the second rate adaptation table.

Figure 23:
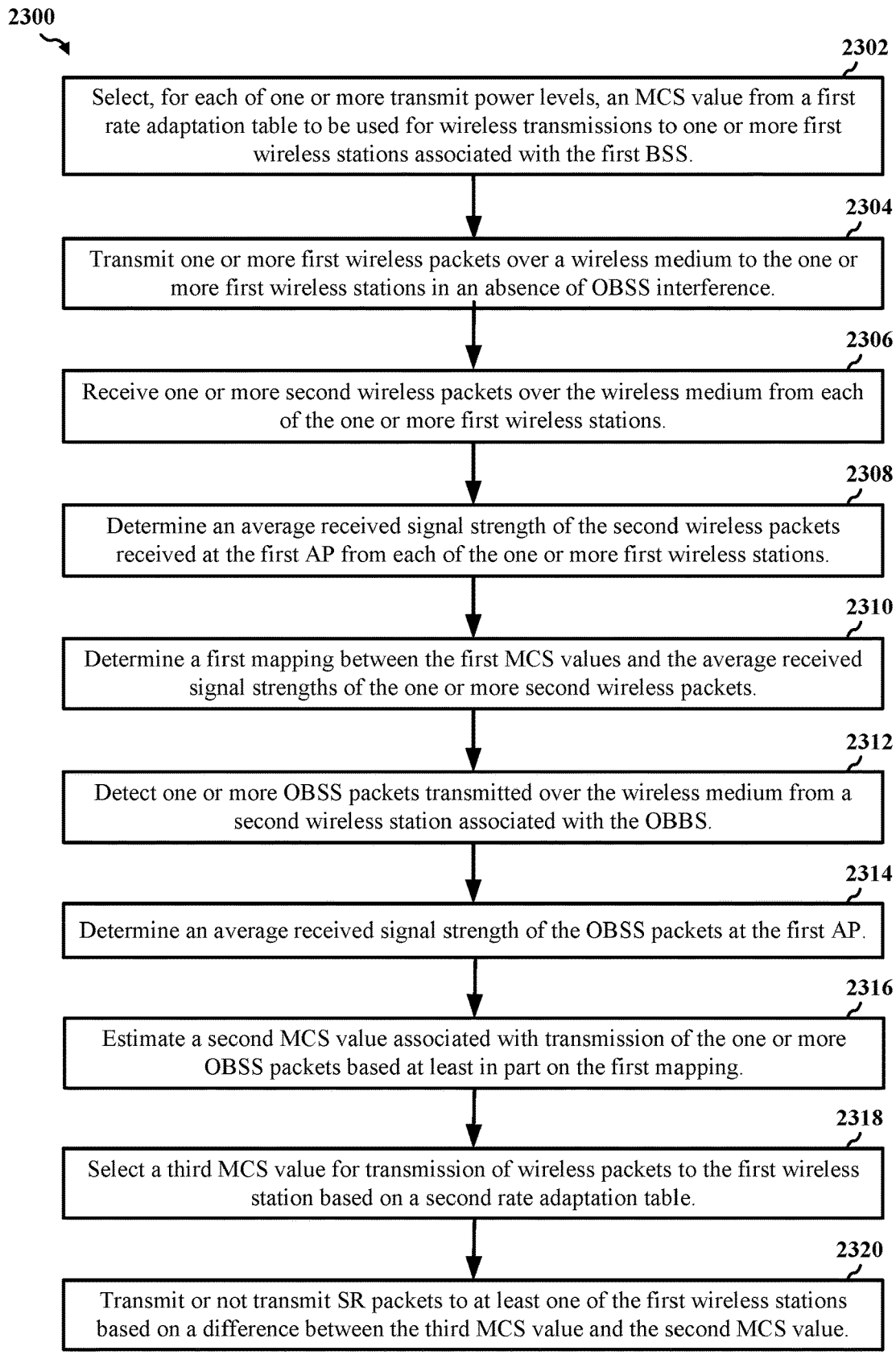
FIG. 23 shows a flowchart illustrating an example operation for wireless communication that supports spatial reuse according to some other implementations.

FIG. 23 shows a flowchart illustrating an example operation 2300 for wireless communication that supports spatial reuse according to some other implementations. The operation 2300 may be performed by a wireless communication device such as the wireless communication device 500 described above with reference to FIG. 5. In some implementations, the operation 2300 may be performed by a wireless communication device operating as or within an AP, such as one of the APs 102 and 602 described above with reference to FIGS. 1 and 6A, respectively. In the example of FIG. 23, the operation 2300 is performed by a first AP associated with a first BSS.

At block 2302, the first AP selects, for each of one or more transmit power levels, a modulation and coding scheme (MCS) value to be used for wireless transmissions to one or more first wireless stations associated with the first BSS. At block 2304, the first AP transmits one or more first wireless packets over a wireless medium to the one or more first wireless stations in an absence of overlapping BSS (OBSS) interference on the wireless medium. At block 2306, the first AP receives one or more second wireless packets over the wireless medium from each of the one or more first wireless stations. At block 2308, the first AP determines an average received signal strength of the one or more second wireless packets received at the first AP from each of the one or more first wireless stations. At block 2310, the first AP determines a first mapping between the first MCS values and the average received signal strengths of the one or more second wireless packets. At block 2312, the first AP detects one or more OBSS packets transmitted over the wireless medium from a second wireless station associated with the OBBS. At block 2314, the first AP determines an average received signal strength of the one or more OBSS packets at the first AP. At block 2316, the first AP estimates a second MCS value associated with transmission of the one or more OBSS packets based at least in part on the first mapping. At block 2318, the first AP selects a third MCS value for transmission of wireless packets to the first wireless station based on a second rate adaptation table. At block 2320, the first AP transmits or does not transmit one or more spatial reuse (SR) packets to at least one of the first wireless stations based on a difference between the first MCS value and the estimated second MCS value for a corresponding transmit power level of the first AP. In some implementations, the first AP transmits the one or more SR packets to the at least one first wireless station based on the third MCS value exceeding the estimated second MCS value, and refrains from transmitting the one or more SR packets to the at least one first wireless station based on the third MCS value not exceeding the estimated second MCS value.

In some implementations, the one or more OBSS packets may be transmitted over the wireless medium from the second STA to a second AP associated with the OBSS. In some instances, the one or more OBSS packets may be one or more acknowledgement frames. In some other instances, the one or more OBSS packets may be a spatial reuse (SR) opportunity in the OBSS.

In some implementations, each of the one or more first wireless packets may be a beacon frame. In some instances, each of the one or more second wireless packets may be an acknowledgement frame. In some other instances, each of the one or more second wireless packets may be a response frame.

In some implementations, the first AP may store the first mapping between the first MCS values and the average received signal strengths of the one or more second wireless packets received from a respective first wireless station in a corresponding first mapping table, and may store a second mapping between the estimated second MCS values and the average received signal strengths of the one or more OBSS packets in a corresponding mapping second table.

Figure 24:
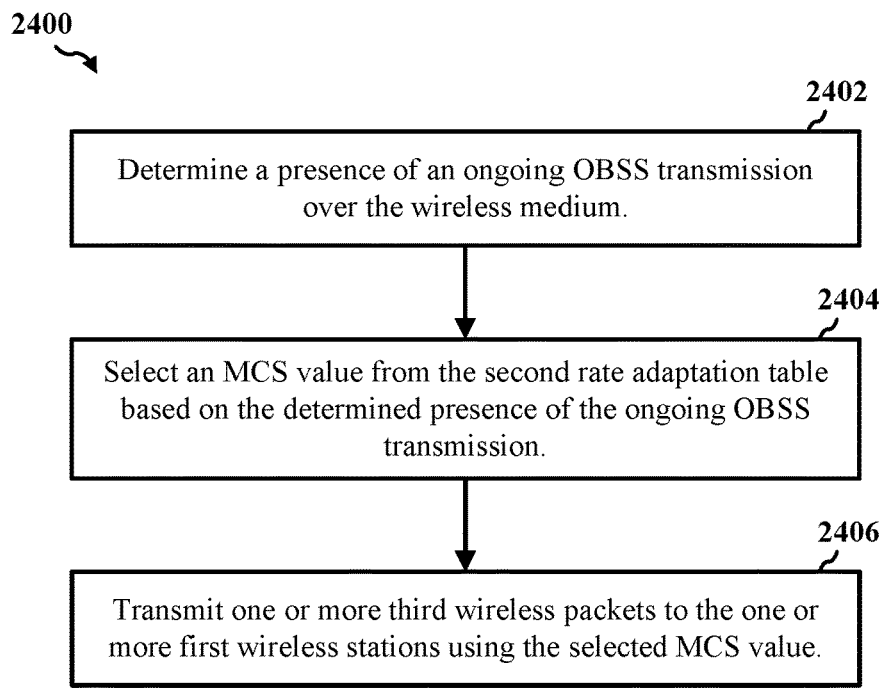
FIG. 24 shows a flowchart illustrating an example operation for wireless communication that supports spatial reuse according to some other implementations.

FIG. 24 shows a flowchart illustrating an example operation 2400 for wireless communication that supports spatial reuse according to some other implementations. The operation 2400 may be performed by a wireless communication device such as the wireless communication device 500 described above with reference to FIG. 5. In some implementations, the operation 2400 may be performed by a wireless communication device operating as or within an AP, such as one of the APs 102 and 602 described above with reference to FIGS. 1 and 6A, respectively. In the example of FIG. 24, the operation 2400 is performed by the first AP associated with the first BSS.

In some implementations, the operation 2400 may be performed after the operation 2300 of FIG. 23. For example, at block 2402, the first AP determines a presence of an ongoing OBSS transmission over the wireless medium. At block 2404, the first AP selects an MCS value from the second rate adaptation table based on the determined presence of the ongoing OBSS transmission. At block 2406, the first AP transmits one or more third wireless packets to the one or more first wireless stations using the selected MCS value from the second rate adaptation table. In some implementations, the second rate adaptation table may include one or more MCS values for transmitting wireless packets to the one or more first wireless stations in the presence of OBSS interference.

Figure 25:
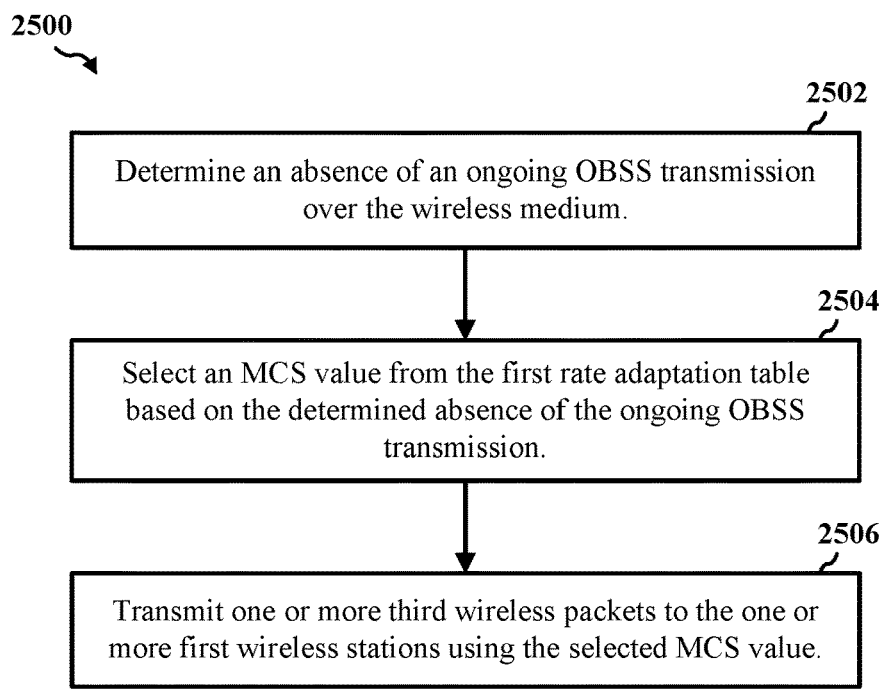
FIG. 25 shows a flowchart illustrating an example operation for wireless communication that supports spatial reuse according to some other implementations.

FIG. 25 shows a flowchart illustrating an example operation 2500 for wireless communication that supports spatial reuse according to some other implementations. The operation 2500 may be performed by a wireless communication device such as the wireless communication device 500 described above with reference to FIG. 5. In some implementations, the operation 2500 may be performed by a wireless communication device operating as or within an AP, such as one of the APs 102 and 602 described above with reference to FIGS. 1 and 6A, respectively. In the example of FIG. 25, the operation 2500 is performed by the first AP associated with the first BSS.

In some implementations, the operation 2500 may be performed after the operation 2300 of FIG. 23. For example, at block 2502, the first AP determines an absence of an ongoing OBSS transmission over the wireless medium. At block 2504, the first AP selects an MCS value from the first rate adaptation table based on the determined absence of the ongoing OBSS transmission. At block 2506, the first AP transmits one or more third wireless packets to the one or more first wireless stations using the selected MCS value from the first rate adaptation table. In some implementations, the first rate adaptation table may include one or more MCS values for transmitting wireless packets to the one or more first wireless stations in the absence of OBSS interference.

Implementation examples are described in the following numbered clauses:

1. A method for wireless communication by a first wireless access point associated with a first basic service set (BSS), including:
    determining a first expected received signal strength at a first wireless station associated with the first BSS for a first wireless packet to be transmitted by the first wireless access point on a wireless medium;
    determining a second expected received signal strength at the first wireless station for a second wireless packet transmitted or to be transmitted by a second wireless access point associated with an overlapping BSS (OBSS);
    determining a third expected received signal strength at a second wireless station associated with the OBSS for the first wireless packet to be transmitted by the first wireless access point;
    determining a noise floor of the wireless medium; and
    transmitting or not transmitting the first wireless packet based on whether a first ratio of the first expected received signal strength to a sum of the second expected received signal strength and the noise floor is greater than a second ratio of the third expected received signal strength to the noise floor.

2. The method of clause 1, where determining the first expected received signal strength includes:
    transmitting one or more intra-BSS packets to the first wireless station;
    receiving, from the first wireless station, a first indication of a first received signal strength of the one or more intra-BSS packets as measured at the first wireless station; and
    determining the first expected received signal strength based on the first received signal strength.

3. The method of clause 2, where determining the first expected received signal strength includes:
    determining a path loss to the first wireless station based on the first received signal strength of the one or more intra-BSS packets as measured by the first wireless station; and
    determining the first expected received signal strength based on the determined path loss to the first wireless station.

4. The method of clause 3, where determining the path loss to the first wireless station includes determining an average path loss to the first wireless station over a period of time during which the one or more intra-BSS packets are transmitted to the first wireless station, where the first expected received signal strength is based on the determined average path loss to the first wireless station.

5. The method of any one of clauses 2-4, where each of the one or more intra-BSS packets includes a beacon frame.

6. The method of any one of clauses 2-5, further including transmitting a first request to the first wireless station to measure the received signal strengths of the one or more intra-BSS packets, where the first indication is received responsive to the first request.

7. The method of clause 6, where the first request includes a beacon request element, and the first indication is received in one or more beacon report elements.

8 The method of any one of clauses 1-7, where determining the second expected received signal strength includes:
    receiving, from the first wireless station, a second indication of a second received signal strength of each of one or more OBSS packets transmitted by the second wireless access point as measured at the first wireless station;
    determining a third received signal strength of each of the one or more OBSS packets transmitted by the second wireless access point as measured at the first wireless access point; and
    determining the second expected received signal strength based on the second and third received signal strengths.

9. The method of clause 8, further including transmitting a second request to the first wireless station to measure a Received Channel Power Indicator (RCPI) for the one or more OBSS packets, where the second indication is received responsive to the second request.

10. The method of any one of clauses 8-9, where the second request includes a frame request element, and the second indication is received in a frame report element.

11. The method of clause 10, where the second indication includes an average RCPI of the RCPIs determined for the one or more OBSS packets.

12. The method of any one of clauses 8-11, where determining the second expected received signal strength includes:
    determining an average of the third received signal strengths of the one or more OBSS packets at the first wireless access point; and
    determining the second expected received signal strength based on the average RCPI of the one or more OBSS packets received at the first wireless station plus an instantaneous value of third received signal strengths minus the average of the third received signal strengths.

13. The method of clause 12, where determining the third received signal strength includes:
    determining an average receive power at the first wireless access point based on the third received signal strengths determined for the one or more OBSS packets, where the second expected received signal strength is based on the second received signal strengths and the determined average receive power.

14. The method of any one of clauses 1-13, where determining the third expected received signal strength includes:
    determining a fourth received signal strength of at least one OBSS packet transmitted from the second wireless station as measured at the first wireless access point; and
    determining the third expected received signal strength based on the fourth received signal strength, an estimate of a transmit power of the second wireless station, and a transmit power of the first wireless access point for the first wireless packet.

15. The method of clause 14, further including estimating the transmit power of the second wireless station by:
    estimating a path loss to each of a plurality of wireless stations in the first BSS including the first wireless station;

determining, for each of the plurality of wireless stations in the first BSS, an average receive power at the first wireless access point for wireless packets received from the respective wireless station;
estimating, for each of the plurality of wireless stations in the first BSS, an average transmit power at the respective wireless station based on the respective estimated path loss, the respective average receive power, and a respective modulation and coding scheme (MCS) used for transmissions by the respective wireless station; and
estimating the transmit power of the second wireless station in the OBSS based on the estimated average transmit powers of the plurality of wireless stations in the first BSS.

16. The method of clause 15, where estimating the transmit power of the second wireless station includes determining, as the estimate of the transmit power of the second wireless station, a lowest one of the estimated average transmit powers.

17. A wireless communication device associated with a first basic service set (BSS), including:
at least one modem;
at least one processor communicatively coupled with the at least one modem; and
at least one memory communicatively coupled with the at least one processor and storing instructions that, when executed by the at least one processor in conjunction with the at least one modem, causes the wireless communication device to perform the method of any one or more of clauses 1-16.

18. A wireless communication device associated with a first basic service set (BSS), including means for performing the method of any one or more of clauses 1-16.

19. An access point including:
the wireless communication device of clause 17;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver and at least a portion of the at least one antenna.

20. A method for wireless communication by a first wireless access point of a first basic service set (BSS), including:
transmitting one or more first wireless packets;
receiving, from a first wireless station associated with the first BSS, a first indication of a first received signal strength of the one or more first wireless packets as measured at the first wireless station;
receiving, from the first wireless station, a second indication of a second received signal strength of one or more second wireless packets transmitted by a second wireless access point associated with an overlapping BSS (OBSS) as measured at the first wireless station;
determining third received signal strengths of one or more third wireless packets transmitted by the second wireless access point as measured at the first wireless access point;
determining fourth received signal strengths of one or more fourth wireless packets transmitted by a second wireless station associated with the OBSS and measured at the first wireless access point; and
transmitting or not transmitting a fifth wireless packet to the first wireless station based on the first, the second, the third, and the fourth received signal strengths.

21. The method of clause 20, where the one or more second wireless packets include the one or more third wireless packets.

22. The method of any one of clauses 20-21, where each of the one or more first wireless packets includes a beacon frame.

23. The method of any one of clauses 20-22, further including transmitting a first request to the first wireless station to measure the first received signal strength, where the first indication is received responsive to the first request.

24. The method of clause 23, where the first request includes a beacon request, and the first indication is received in a beacon report.

25. The method of any one of clauses 20-24, further including transmitting a second request to the first wireless station to measure the second received signal strength, where the second indication is received responsive to the second request.

26. The method of clause 25, where the second request includes a frame request, and the second indication is received in one or more frame reports.

27. The method of clause 26, where the second indication includes an average Received Channel Power Indicator (RCPI) of the one or more second wireless packets transmitted by the second wireless access point.

28. The method of any one of clauses 20-27, where one or more of the first received signal strengths, the second received signal strengths, the third received signal strengths, or the fourth received signal strengths is an average received signal strength.

29. The method of any one of clauses 20-28, further including:
determining a path loss to the first wireless station based at least in part on the first received signal strengths; and
determining a first expected received signal strength for the fifth wireless packet at the first wireless station based at least in part on the determined path loss, where transmitting or not transmitting the fifth wireless packet is based at least in part on the first expected received signal strength.

30. The method of clause 28, where determining the path loss to the first wireless station includes determining an average path loss to the first wireless station over a period of time during which the one or more first wireless packets are transmitted, where the first expected received signal strength is based at least in part on the average path loss.

31. The method of any one of clauses 20-30, further including determining a second expected received signal strength at the first wireless station for a wireless packet transmitted by the second wireless access point based at least in part on the second received signal strengths and the third received signal strengths, where transmitting or not transmitting the fifth wireless packet is based at least in part on the second expected received signal strength.

32. The method of clause 31, where determining the third received signal strengths of the one or more third wireless packets includes:
determining an average receive power at the first wireless access point based at least in part on the third received signal strengths, where the second expected received signal strength is based at least in part on the second received signal strengths and the determined average receive power at the first AP.

33. The method of any one of clauses 20-32, further including:
  estimating a transmit power of the second wireless station associated with the OBSS; and
  determining an expected received signal strength at the second wireless station for the fifth wireless packet transmitted by the first wireless access point based on the fourth received signal strengths, the estimated transmit power of the second wireless station, and a transmit power of the first wireless access point for the fifth wireless packet, where transmitting or not transmitting the fifth wireless packet is based at least in part on the expected received signal strength at the second wireless station for the fifth wireless packet.

34. The method of clause 33, where estimating the transmit power of the second wireless station includes:
  estimating a path loss to each of a plurality of wireless stations in the first BSS;
  determining, for each of the plurality of wireless stations in the first BSS, an average receive power at the first wireless access point of wireless packets transmitted by the respective wireless station in the first BSS;
  estimating, for each of the plurality of wireless stations in the first BSS, an average transmit power at the respective wireless station based on the respective estimated path loss, the respective average receive power, and a respective modulation and coding scheme (MCS) used for transmissions by the respective wireless station in the first BSS; and
  estimating the transmit power of the second wireless station based at least in part on the estimated average transmit powers of the plurality of wireless stations in the first BSS.

35. The method of clause 34, where the plurality of wireless stations in the first BSS includes the first wireless station.

36. The method of any one of clauses 33-34, where estimating the transmit power of the second wireless station includes determining, as the estimated transmit power of the second wireless station, a lowest one of the estimated average transmit powers.

37. The method of any one of clauses 33-36, further including:
  determining a first expected received signal strength at the first wireless station for the fifth wireless packet based on the first received signal strengths;
  determining a second expected received signal strength at the first wireless station for an OBSS packet transmitted by the second wireless access point based on the second received signal strengths and the third received signal strengths; and
  determining a third expected received signal strength at the second wireless station for the fifth wireless packet based on the fourth received signal strength, an estimate of a transmit power of the second wireless station, and a transmit power of the first wireless access point for the fifth wireless packet;
  where transmitting or not transmitting the fifth wireless packet is based at least in part on the first, the second, and the third expected received signal strengths.

38. The method of clause 37, further including determining a noise floor, where the transmitting or not transmitting the fifth wireless packet is further based on the determined noise floor.

39. The method of clause 38, where transmitting or not transmitting the fifth wireless packet is based on determining that a first ratio of the first expected received signal strength to a sum of the second expected received signal strength and the noise floor is greater than a second ratio of the third expected received signal strength to the noise floor.

40. A wireless communication device associated with a first basic service set (BSS), including:
  at least one modem;
  at least one processor communicatively coupled with the at least one modem; and
  at least one memory communicatively coupled with the at least one processor and storing instructions that, when executed by the at least one processor in conjunction with the at least one modem, causes the wireless communication device to perform the method of any one or more of clauses 20-39.

41. A wireless communication device associated with a first basic service set (BSS), including means for performing the method of any one or more of clauses 20-39.

42. An access point including:
  the wireless communication device of clause 40;
  at least one transceiver coupled to the at least one modem;
  at least one antenna coupled to the at least one transceiver to wirelessly transmit signals output from the at least one transceiver and to wirelessly receive signals for input into the at least one transceiver; and
  a housing that encompasses the at least one modem, the at least one processor, the at least one memory, the at least one transceiver and at least a portion of the at least one antenna.

43. A method for wireless communication by a first wireless access point of a first basic service set (BSS), including:
  selecting, for each of one or more transmit power levels, a modulation and coding scheme (MCS) value from a first rate adaptation table to be used for wireless transmissions to one or more first wireless stations associated with the first BSS;
  transmitting one or more first wireless packets over a wireless medium to the one or more first wireless stations in an absence of overlapping BSS (OBSS) interference on the wireless medium;
  receiving one or more second wireless packets over the wireless medium from each of the one or more first wireless stations;
  determining an average received signal strength of the one or more second wireless packets received at the first AP from each of the one or more first wireless stations;
  determining a first mapping between the first MCS values and the average received signal strengths of the one or more second wireless packets;
  detecting one or more OBSS packets transmitted over the wireless medium from a second wireless station associated with the OBBS;
  determining an average received signal strength of the one or more OBSS packets at the first AP;
  estimating a second MCS value associated with transmission of the one or more OBSS packets based at least in part on the first mapping;
  selecting a third MCS value for transmission of wireless packets to the first wireless station based on a second rate adaptation table; and
  transmitting or not transmitting one or more spatial reuse (SR) packets to at least one of the first wireless stations based on a difference between the third MCS value and the estimated second MCS value for a corresponding transmit power level of the first AP.

44. The method of clause 43, where the one or more OBSS packets are transmitted over the wireless medium from the second STA to a second AP associated with the OBSS.

45. The method of any one of clauses 43-44, where the one or more OBSS packets include one or more acknowledgement frames.

46. The method of any one or more of clauses 43-45, where the one or more OBSS packets include a spatial reuse (SR) opportunity in the OBSS.

47. The method of any one or more of clauses 43-46, where each of the one or more first wireless packets includes a beacon frame.

48. The method of clause 47, where each of the one or more second wireless packets includes an acknowledgement frame.

49. The method of clause 47, where each of the one or more second wireless packets includes a response frame.

50. The method of any one or more of clauses 43-49, where the first AP transmits the one or more SR packets to the at least one first wireless station based on the third MCS value exceeding the estimated second MCS value.

51. The method of any one or more of clauses 43-49, where the first AP refrains from transmitting the one or more SR packets to the at least one first wireless station based on the third MCS value not exceeding the estimated second MCS value.

52. The method of any one or more of clauses 43-51, further including:
storing the first mapping between the first MCS values and the average received signal strengths of the one or more second wireless packets received from a respective first wireless station in a corresponding first mapping table; and
storing a second mapping between the estimated second MCS values and the average received signal strengths of the one or more OBSS packets in a corresponding mapping second table.

53. The method of clause 52, where the first AP stores the first and second mapping tables for each of the one or more first wireless stations.

54. The method of any one of clauses 43-53, where the first AP stores the first and second rate adaptation tables for each of the one or more first wireless stations.

55. The method of any one of clauses 53-54, where:
the first rate adaptation table includes one or more MCS values for transmitting wireless packets to the one or more first wireless stations in the absence of OBSS interference; and
the second rate adaptation table includes one or more MCS values for transmitting wireless packets to the one or more first wireless stations in the presence of OBSS interference.

56. The method of any one or more of clauses 43-55, further including:
determining a presence of an ongoing OBSS transmission over the wireless medium;
selecting an MCS value from the second rate adaptation table based on the determined presence of the ongoing OBSS transmission; and
transmitting one or more third wireless packets to the one or more first wireless stations using the selected MCS value from the second rate adaptation table.

57. The method of any one or more of clauses 43-55, further including:
determining an absence of an ongoing OBSS transmission over the wireless medium;
selecting an MCS value from the first rate adaptation table based on the determined absence of the ongoing OBSS transmission; and
transmitting one or more third wireless packets to the one or more first wireless stations using the selected MCS value from the first rate adaptation table.

58. The method of any one or more of clauses 43-57, where the received signal strengths include average Received Channel Power Indicators (RCPI).

59. A wireless communication device associated with a first basic service set (BSS), including:
at least one modem;
at least one processor communicatively coupled with the at least one modem; and
at least one memory communicatively coupled with the at least one processor and storing instructions that, when executed by the at least one processor in conjunction with the at least one modem, causes the wireless communication device to perform the method of any one or more of clauses 43-58.

60. A wireless communication device associated with a first basic service set (BSS), including means for performing the method of any one or more of clauses 43-58.

61. An access point including:
the wireless communication device of clause 59;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver and at least a portion of the at least one antenna.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless access point (AP) associated with a first basic service set (BSS), comprising:
   determining a first expected received signal strength at a first wireless station associated with the first BSS for a first wireless packet to be transmitted by the first AP via a wireless medium;
   determining a second expected received signal strength at the first wireless station for a second wireless packet transmitted or to be transmitted by a second AP associated with an overlapping BSS (OBSS);
   determining a third expected received signal strength at a second wireless station associated with the OBSS for the first wireless packet to be transmitted by the first AP;
   determining a noise floor of the wireless medium; and
   transmitting or not transmitting the first wireless packet based on whether a first ratio of the first expected received signal strength to a sum of the second expected received signal strength and the noise floor is greater than a second ratio of the third expected received signal strength to the noise floor.

2. The method of claim 1, wherein determining the first expected received signal strength comprises:
   transmitting one or more intra-BSS packets to the first wireless station;
   receiving, from the first wireless station, a first indication of received signal strengths of the one or more intra-BSS packets as measured at the first wireless station; and
   determining the first expected received signal strength based on the received signal strengths.

3. The method of claim 2, wherein determining the first expected received signal strength comprises:
   determining a path loss to the first wireless station based on the received signal strengths of the one or more intra-BSS packets as measured at the first wireless station; and
   determining the first expected received signal strength based on the determined path loss to the first wireless station.

4. The method of claim 2, further comprising transmitting a first request to the first wireless station to measure the received signal strengths of the one or more intra-BSS packets, wherein the first request comprises a beacon request element, and the first indication is received in one or more beacon report elements responsive to the first request.

5. The method of claim 1, wherein determining the second expected received signal strength comprises:
   receiving, from the first wireless station, a second indication of a second received signal strength of each of one or more OBSS packets transmitted by the second AP as measured at the first wireless station;
   determining a third received signal strength of each of the one or more OBSS packets transmitted by the second AP as measured at the first AP; and
   determining the second expected received signal strength based on the second received signal strength and the third received signal strength.

6. The method of claim 5, further comprising transmitting a second request to the first wireless station to measure a Received Channel Power Indicator (RCPI) for the one or more OBSS packets, wherein the second request comprises a frame request element, and the second indication is received in a frame report element responsive to the second request.

7. The method of claim 5, wherein determining the second expected received signal strength comprises:
   determining an average of the third received signal strength of each of the one or more OBSS packets as measured at the first AP; and
   determining the second expected received signal strength based on an average RCPI of the one or more OBSS packets received at the first wireless station plus an instantaneous value of the third received signal strength of an OBSS packet minus the average of the third received signal strength of each of the one or more OBSS packets.

8. The method of claim 7, wherein determining the third received signal strength of each of the one or more OBSS packets comprises:
   determining an average receive power at the first AP based on the third received signal strength of each of the one or more OBSS packets, wherein the second expected received signal strength is based on the second received signal strength and the determined average receive power.

9. The method of claim 1, wherein determining the third expected received signal strength comprises:
   determining a fourth received signal strength of at least one OBSS packet transmitted from the second wireless station as measured at the first AP; and
   determining the third expected received signal strength based on the fourth received signal strength, an estimate of a transmit power of the second wireless station, and a transmit power of the first AP for the first wireless packet.

10. The method of claim 9, further comprising estimating the transmit power of the second wireless station by:

estimating a path loss to each of a plurality of wireless stations in the first BSS including the first wireless station;

determining, for each of the plurality of wireless stations in the first BSS, an average receive power at the first AP for wireless packets received from a respective wireless station;

estimating, for each of the plurality of wireless stations in the first BSS, an average transmit power at the respective wireless station based on the estimated path loss, the average receive power, and a respective modulation and coding scheme (MCS) used for transmissions by the respective wireless station; and estimating the transmit power of the second wireless station in the OBSS based on estimated average transmit powers of the plurality of wireless stations in the first BSS.

11. A first wireless access point (AP) associated with a first basic service set (BSS), comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to cause the first AP to:

determine a first expected received signal strength at a first wireless station associated with the first BSS for a first wireless packet to be transmitted by the first AP via a wireless medium;

determine a second expected received signal strength at the first wireless station for a second wireless packet transmitted or to be transmitted by a second AP associated with an overlapping BSS (OBSS);

determine a third expected received signal strength at a second wireless station associated with the OBSS for the first wireless packet to be transmitted by the first AP;

determine a noise floor of the wireless medium; and transmit or not transmit the first wireless packet based on whether a first ratio of the first expected received signal strength to a sum of the second expected received signal strength and the noise floor is greater than a second ratio of the third expected received signal strength to the noise floor.

12. The first AP of claim 11, wherein execution of the processor-readable code to determine the first expected received signal strength is configured to cause the first AP to:

transmit one or more intra-BSS packets to the first wireless station;

receive, from the first wireless station, a first indication of a first received signal strength of the one or more intra-BSS packets as measured at the first wireless station; and determine the first expected received signal strength based on the first received signal strength.

13. The first AP of claim 12, wherein execution of the processor-readable code to determine the first expected received signal strength is configured to cause the first AP to:

determine a path loss to the first wireless station based on the first received signal strength of the one or more intra-BSS packets as measured by the first wireless station; and determine the first expected received signal strength based on the determined path loss to the first wireless station.

14. A method for wireless communication by a first wireless access point (AP) associated with a first basic service set (BSS), comprising:

transmitting one or more first wireless packets;

receiving, from a first wireless station associated with the first BSS, a first indication of a first received signal strength of the one or more first wireless packets as measured at the first wireless station;

receiving, from the first wireless station, a second indication of a second received signal strength of one or more second wireless packets transmitted by a second AP associated with an overlapping BSS (OBSS) as measured at the first wireless station;

determining third received signal strengths of one or more third wireless packets transmitted by the second AP as measured at the first AP;

determining fourth received signal strengths of one or more fourth wireless packets transmitted by a second wireless station associated with the OBSS and measured at the first AP; and transmitting or not transmitting a fifth wireless packet to the first wireless station based on the first received signal strength, the second received signal strength, the third received signal strengths, and the fourth received signal strengths.

15. The method of claim 14, wherein the one or more second wireless packets comprise the one or more third wireless packets.

16. The method of claim 14, further comprising:

transmitting a first request to the first wireless station to measure the first received signal strength, wherein the first request comprises a beacon request, and the first indication is received in a beacon report responsive to the first request; and transmitting a second request to the first wireless station to measure the second received signal strength, wherein the second request comprises a frame request, and the second indication is received in one or more frame reports responsive to the second request.

17. The method of claim 16, wherein the second indication comprises an average Received Channel Power Indicator (RCPI) of the one or more second wireless packets transmitted by the second AP.

18. The method of claim 14, further comprising:

determining a path loss to the first wireless station based at least in part on the first received signal strength; and determining a first expected received signal strength for the fifth wireless packet at the first wireless station based at least in part on the determined path loss, wherein transmitting or not transmitting the fifth wireless packet is based at least in part on the first expected received signal strength.

19. The method of claim 14, further comprising determining a second expected received signal strength at the first wireless station for a wireless packet transmitted by the second AP based at least in part on the second received signal strength and the third received signal strengths, wherein transmitting or not transmitting the fifth wireless packet is based at least in part on the second expected received signal strength.

20. The method of claim 19, wherein determining the third received signal strengths of the one or more third wireless packets comprises:

determining an average receive power at the first AP based at least in part on the third received signal strengths, wherein the second expected received signal strength is based at least in part on the second received signal strength and the determined average receive power at the first AP.

21. The method of claim 14, further comprising:
estimating a transmit power of the second wireless station associated with the OBSS; and
determining an expected received signal strength at the second wireless station for the fifth wireless packet transmitted by the first AP based on the fourth received signal strengths, the estimated transmit power of the second wireless station, and a transmit power of the first AP for the fifth wireless packet, wherein transmitting or not transmitting the fifth wireless packet is based at least in part on the expected received signal strength at the second wireless station for the fifth wireless packet.

22. The method of claim 21, wherein estimating the transmit power of the second wireless station comprises:
estimating a path loss to each of a plurality of wireless stations in the first BSS;
determining, for each of the plurality of wireless stations in the first BSS, an average receive power at the first AP of wireless packets transmitted by a respective wireless station in the first BSS;
estimating, for each of the plurality of wireless stations in the first BSS, an average transmit power at the respective wireless station based on the estimated path loss, the average receive power, and a respective modulation and coding scheme (MCS) used for transmissions by the respective wireless station in the first BSS; and
estimating the transmit power of the second wireless station based at least in part on estimated average transmit powers of the plurality of wireless stations in the first BSS.

23. The method of claim 21, further comprising:
determining a first expected received signal strength at the first wireless station for the fifth wireless packet based on the first received signal strength;
determining a second expected received signal strength at the first wireless station for an OBSS packet transmitted by the second AP based on the second received signal strength and the third received signal strengths; and
determining a third expected received signal strength at the second wireless station for the fifth wireless packet based on the fourth received signal strengths, the estimated transmit power of the second wireless station, and the transmit power of the first AP for the fifth wireless packet;
wherein transmitting or not transmitting the fifth wireless packet is based at least in part on the first expected received signal strength, the second expected received signal strength, and the third expected received signal strength.

24. The method of claim 23, further comprising determining a noise floor, wherein the transmitting or not transmitting the fifth wireless packet is further based on determining that a first ratio of the first expected received signal strength to a sum of the second expected received signal strength and the noise floor is greater than a second ratio of the third expected received signal strength to the noise floor.

25. A first wireless access point (AP) associated with a first basic service set (BSS), comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to cause the first AP to:
transmit one or more first wireless packets;
receive, from a first wireless station associated with the first BSS, a first indication of a first received signal strength of the one or more first wireless packets as measured at the first wireless station;
receive, from the first wireless station, a second indication of a second received signal strength of one or more second wireless packets transmitted by a second AP associated with an overlapping BSS (OBSS) as measured at the first wireless station;
determine third received signal strengths of one or more third wireless packets transmitted by the second AP as measured at the first AP;
determine fourth received signal strengths of one or more fourth wireless packets transmitted by a second wireless station associated with the OBSS and measured at the first AP; and
transmit or not transmit a fifth wireless packet to the first wireless station based on the first received signal strength, the second received signal strength, the third received signal strengths, and the fourth received signal strengths.

26. The first AP of claim 25, wherein execution of the processor-readable code is further configured to cause the first AP to:
transmit a first request to the first wireless station to measure the first received signal strength, wherein the first request comprises a beacon request, and the first indication is received in a beacon report responsive to the first request; and
transmit a second request to the first wireless station to measure the second received signal strength, wherein the second request comprises a frame request, and the second indication is received in one or more frame reports responsive to the second request.

27. The first AP of claim 25, wherein execution of the processor-readable code is further configured to cause the first AP to:
determine a path loss to the first wireless station based at least in part on the first received signal strength; and
determine a first expected received signal strength for the fifth wireless packet at the first wireless station based at least in part on the determined path loss, wherein transmitting or not transmitting the fifth wireless packet is based at least in part on the first expected received signal strength.

28. The first AP of claim 25,
wherein execution of the processor-readable code is further configured to cause the first AP to determine a second expected received signal strength at the first wireless station for a wireless packet transmitted by the second AP based at least in part on the second received signal strength and the third received signal strengths, wherein transmitting or not transmitting the fifth wireless packet is based at least in part on the second expected received signal strength.

29. The first AP of claim 28, wherein execution of the processor-readable code to determine the third received signal strengths of the one or more third wireless packets is configured to cause the first AP to:
determine an average receive power at the first AP based at least in part on the third received signal strengths, wherein the second expected received signal strength is based at least in part on the second received signal strength and the determined average receive power at the first AP.

30. The first AP of claim 25, wherein execution of the processor-readable code is further configured to cause the first AP to:

estimate a transmit power of the second wireless station associated with the OBSS; and determine an expected received signal strength at the second wireless station for the fifth wireless packet transmitted by the first AP based on the fourth received signal strengths, the estimated transmit power of the second wireless station, and a transmit power of the first AP for the fifth wireless packet, wherein transmitting or not transmitting the fifth wireless packet is based at least in part on the expected received signal strength at the second wireless station for the fifth wireless packet.

* * * * *